United States Patent
Kokubo et al.

(10) Patent No.: US 7,597,409 B2
(45) Date of Patent: Oct. 6, 2009

(54) CONTROL UNIT OF BRAKE APPARATUS FOR VEHICLE

(75) Inventors: Koichi Kokubo, Nagoya (JP); Kazuya Maki, Nagoya (JP); Masayuki Naito, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 371 days.

(21) Appl. No.: 11/723,947

(22) Filed: Mar. 22, 2007

(65) Prior Publication Data

US 2007/0228812 A1    Oct. 4, 2007

(30) Foreign Application Priority Data

Apr. 3, 2006  (JP) .............................. 2006-102236
Apr. 10, 2006 (JP) .............................. 2006-107284

(51) Int. Cl.
    *B60T 8/64* (2006.01)
(52) U.S. Cl. .............................. 303/152; 303/3; 303/155
(58) Field of Classification Search .................. 303/3, 303/20, 113.1–113.4, 152, 155; 180/65.2–65.8, 180/165
    See application file for complete search history.

(56) References Cited

U.S. PATENT DOCUMENTS 5,067,778 A * 11/1991 Testardi .................... 303/113.1
6,231,134 B1 * 5/2001 Fukasawa et al. ........... 303/152
6,880,900 B2 * 4/2005 Hara et al. .................. 303/170
2005/0269875 A1  12/2005 Maki et al.

FOREIGN PATENT DOCUMENTS

JP    2004-009914 A    1/2004
JP    2006-21745 A     1/2006

* cited by examiner

*Primary Examiner*—Christopher P Schwartz
(74) *Attorney, Agent, or Firm*—Buchanan Ingersoll & Rooney PC

(57) ABSTRACT

A control unit of a brake apparatus for a vehicle comprises target braking force determining means determining a target value corresponding to a target braking force that is a target value of a braking force on the basis of a basic value corresponding to the basic hydraulic pressure, compensation braking force controlling means controlling a compensation braking force so that a total value corresponding to a total braking force is equal to the target value corresponding to the target braking force, and the target braking force determining means including hunting reducing hydraulic pressure calculating means calculating a controlling value corresponding to a hunting reducing hydraulic pressure, the controlling value obtained by applying process to the basic hydraulic pressure in order to control a variation thereof, and the target value corresponding to the target braking force is determined by use of the controlling value corresponding to the hunting reducing hydraulic pressure.

12 Claims, 16 Drawing Sheets

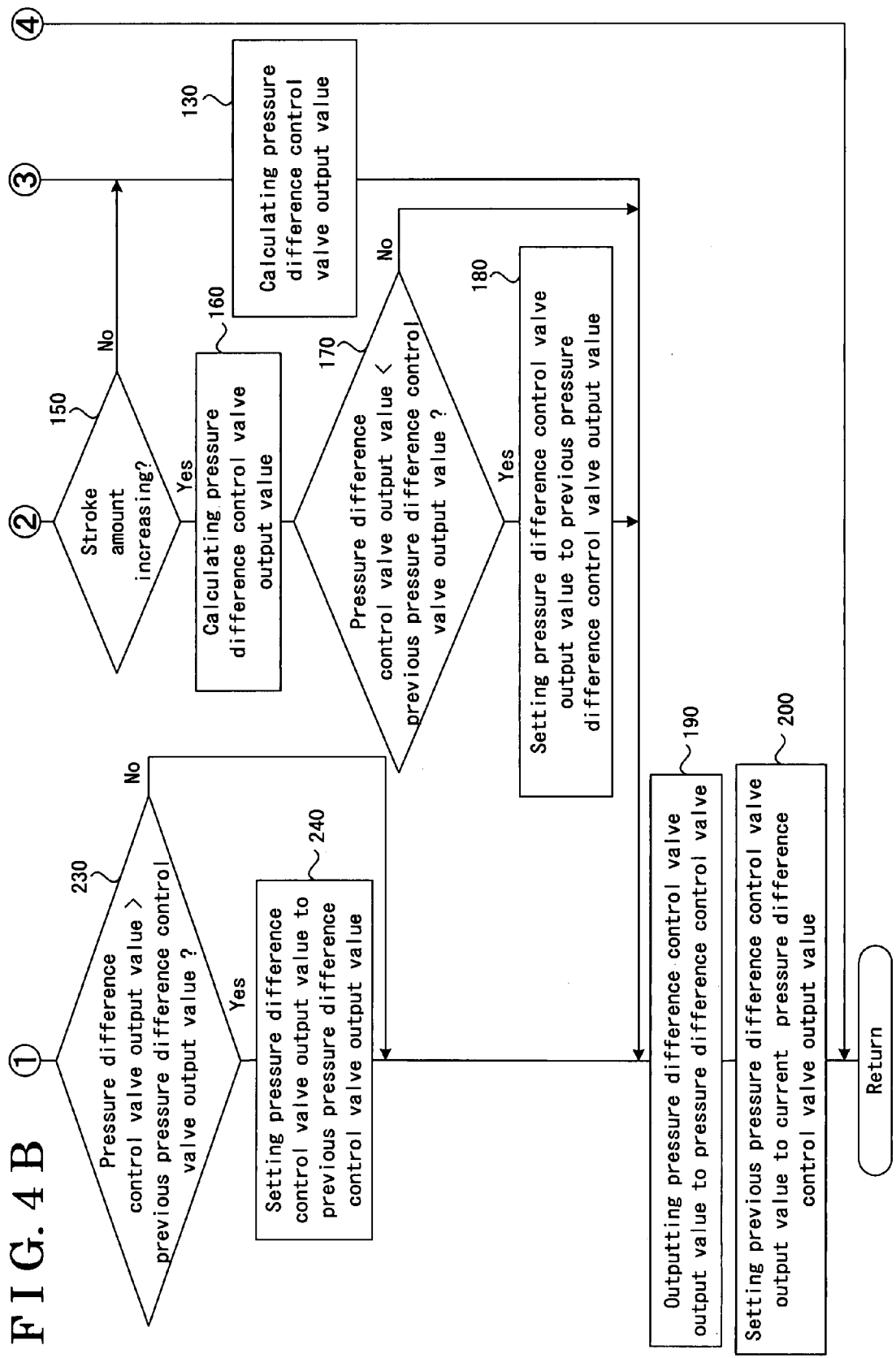

CONTROL UNIT OF BRAKE APPARATUS FOR VEHICLE

CROSS REFERENCE TO RELATED APPLICATIONS

This application is based on and claims priority under 35 U.S.C. § 119 to Japanese Patent Application 2006-102236 filed on Apr. 3, 2006 and Japanese Patent Application 2006-107284 filed on Apr. 10, 2006, the entire content of which is incorporated herein by reference.

FIELD OF THE INVENTION

The present invention relates to a control unit of a brake apparatus for a vehicle generating a braking force by means of a cooperative braking control operated by a hydraulic brake apparatus generating a hydraulic braking force using brake fluid together with a regenerative brake apparatus generating a regenerative braking force using a motor, a generator or the like.

BACKGROUND

A control unit of the brake apparatus for the vehicle disclosed in JP2006-21745A generates a braking force corresponding to a target braking force by means of a cooperative braking control operated using a hydraulic braking force generated by a hydraulic brake apparatus together with a regenerative braking force generated by a regenerative brake apparatus. Specifically, the known control unit of the brake apparatus for the vehicle includes a hydraulic brake apparatus, a regenerative brake apparatus and a braking force compensating means. The hydraulic brake apparatus generates, independently from a braking operation of a driver, a hydraulic braking force for each wheel by applying a brake fluid pressure generated by driving a pump to a wheel cylinder provided at each wheel.

The regenerative brake apparatus generates a regenerative braking force by driving the motor generator. The regenerative braking force corresponds to a braking operation state detected by a brake operation detecting means for detecting the braking operation.

The braking force compensating means compensates a shortage of the braking force, which is caused by variations of the regenerative braking force.

According to the known control unit of the brake apparatus for the vehicle, a driver's request of the braking force is determined on the basis of a master cylinder hydraulic pressure, which varies depending on a level of a depression of a brake pedal.

In this configuration, a target braking force is set on the basis of the variation of the master cylinder hydraulic pressure, and in order to obtain a braking force corresponding to the target braking force, the cooperative braking control using the hydraulic braking force generated by the hydraulic brake apparatus and the regenerative braking force generated by the regenerative braking force.

Further, when the regenerative braking force is reduced, the reduced amount is replaced with the hydraulic braking force. In this situation, a pump provided at the hydraulic brake apparatus sucks the brake fluid from the master cylinder, and such sucked brake fluid is supplied to the wheel cylinder, as a result, an appropriate hydraulic braking force is generated.

However, because the known brake apparatus employs a so called in-line system, in which the master cylinder is connected to the wheel cylinder, when the brake fluid in the master cylinder is sucked by the pump, a level of the master cylinder hydraulic pressure will be reduced. In this situation, because the target braking force is set on the basis of the master cylinder hydraulic pressure, the target braking force may be set to a lower value. In order to overcome such inconvenience, a pressure difference control valve or the like for generating a pressure difference may be provided between the master cylinder and the wheel cylinder in order to control the wheel cylinder hydraulic pressure so as to be higher than the master cylinder hydraulic pressure. In consideration of the pressure difference generated at the pressure difference control valve, the wheel cylinder hydraulic pressure is set and applied to each wheel.

In this configuration, the pressure difference may vary depending on the target braking force, which varies according to the reduction of the master cylinder hydraulic pressure, as a result, a pressure difference output value (control electric current) generated at the pressure difference control valve is reduced. In this situation, the wheel cylinder hydraulic pressure is temporally reduced; as a result, the driver may have a poor brake feeling.

A need thus exists to provide a control unit of a brake apparatus for a vehicle by which the poor brake feeling caused by suction of a brake fluid in the master cylinder is be improved.

Furthermore, a brake apparatus for a vehicle automatically controls hydraulic pressure of wheel cylinders independently from an operation of a brake-operating member such as a brake pedal by a driver has conventionally been known. For example, an automatic braking device for a vehicle disclosed in JP2004-9914A includes: a master cylinder generating a basic hydraulic pressure (master cylinder hydraulic pressure) based upon an operation of a vacuum booster according to the brake-pedal operation by a driver; a pump generating a pressurizing hydraulic pressure so as to be higher than the basic hydraulic pressure by sucking the brake fluid at a hydraulic pressure circuit (at a discharging side of the master cylinder) having the basic hydraulic pressure; and two normally open linear solenoid valves by which the amount of pressurization (pressure differences) for respective systems to be applied to the basic hydraulic pressure is controlled using the pressurizing hydraulic pressure generated by the pump.

For example, when a distance between a vehicle to which the above-described device is mounted and another vehicle driving ahead falls below a predetermined reference distance, this automatic braking device controls the pump and the linear solenoid valve so as to adjust the amount of pressurization. Here, a wheel cylinder pressure is generated by adding the amount of pressurization to the basic hydraulic pressure. The hydraulic braking force is automatically controlled by applying such wheel cylinder pressure to the corresponding wheel cylinder. As a result, the vehicle is automatically applied with braking force independently of the operation of the brake-pedal operation of the driver.

As disclosed in JP2006-21745A, recent developments have led to a technology in which a regenerative cooperative braking control is implemented, which uses hydraulic braking force and uses a motor's regenerative braking force. In this case, the above-described automatic braking device is applied to vehicles, which use motors as power supply, or to what-is-called hybrid-electric vehicles (HEV), which use internal combustion engines and electric batteries to power electric motors.

More specifically, in the brake device disclosed in JP2006-21745A, the boosting characteristics of a vacuum booster is determined so that a basic hydraulic pressure corresponding to a depression amount against a brake pedal becomes lower than a predetermined target pressure value by a specified amount. As a result, "hydraulic braking force (basic hydraulic pressure braking force) based upon the basic hydraulic pressure (master cylinder hydraulic pressure) can be lower than a preset target value by a specified amount.

Here, a compensation braking force is a regenerative braking force by a motor, a hydraulic braking force based upon the amounts of pressurization, or a combination thereof. A total braking force is the sum of the basic hydraulic pressure braking force and the compensation braking force. The compensation braking force, i.e., a regenerative braking force and/or a pressurizing hydraulic braking force, is adjusted according to the depression amount against the brake pedal. As a result, characteristics of the total braking force relative to the depression amount of the brake pedal then agrees with predetermined target characteristics, thereby preventing the driver from having an uncomfortable feeling when braking.

Further, it has been recently proposed that a vacuum booster, having the aforementioned boosting characteristics, is applied to a vehicle, which employs only an internal combustion engine as power supply and is applied with the above-described automatic braking device. In such cases, a compensation braking force consists of only a pressurizing hydraulic braking force. That is, a total braking force is the sum of the basic hydraulic pressure braking force and the compensation braking force having only the pressurizing hydraulic braking force. The compensation braking force (pressurizing hydraulic braking force) is adjusted corresponding to the depression amount of the brake pedal in a manner that characteristics of the total braking force relative to the depression amount against the brake pedal agree with preset target characteristics.

Accordingly, it is possible to use a small-sized vacuum booster so that it can be readily mounted on a vehicle. Further, characteristics of the total braking force relative to the depression amount of the brake pedal is designed to have more flexibilities so that various effects can be expected.

According to the automatic braking device in the JP2004-9914, the pressure circuit employs a configuration (hereinafter referred to as an in-line system) in which the pump sucks the brake fluid from the hydraulic pressure circuit (outlet port of the master cylinder) at which basic hydraulic pressure (master cylinder hydraulic pressure) is generated. However, in this configuration, even when the driver intends to sustain the brake pedal operation to a certain level, the basic hydraulic pressure may vary.

Because the target braking force (or the target wheel cylinder hydraulic pressure), which is determined on the basis of such basic hydraulic pressure, varies in accordance with the variation of the basic hydraulic pressure, the variation of the basic hydraulic pressure continues. This continuation of variation is referred to as "basic hydraulic pressure hunting".

When the basic hydraulic pressure hunting occurs, vibration caused by the hunting is transmitted to the brake pedal, and the driver may have poor brake feeling. A reduction of such basic hydraulic pressure hunting has been expected so far.

Another need thus exists to provide a control unit of a brake apparatus for a vehicle reducing basic hydraulic pressure hunting. Specifically, such control unit is applied to the braking apparatus employing an in-line system, and the braking apparatus generates a total braking force by adding the compensation braking force to the basic hydraulic braking force (=basic hydraulic braking force+compensation braking force).

SUMMARY OF THE INVENTION

According to an aspect of the present invention, a control unit of a brake apparatus for a vehicle, having basic hydraulic pressure generating means generating a basic hydraulic pressure in accordance with an operation at a brake-operating member by a driver, a pump suctioning a brake fluid with the basic hydraulic pressure from a hydraulic pressure circuit in order to generate a pressurizing hydraulic pressure for generating hydraulic pressure that is higher than the basic hydraulic pressure, and a pressure difference control valve controlling an amount of pressurization relative to the basic hydraulic pressure by use of the pressurizing hydraulic pressure generated by driving the pump, wherein a hydraulic braking force is generated by applying wheel cylinder hydraulic pressure to a wheel cylinder, the wheel cylinder hydraulic pressure obtained by adding the amount of pressurization to the basic hydraulic pressure, and the control unit of the brake apparatus for the vehicle, comprises target braking force determining means determining a target value corresponding to a target braking force that is a target value of a braking force generated at the vehicle on the basis of a basic value corresponding to the basic hydraulic pressure, compensation braking force controlling means controlling a compensation braking force so that a total value corresponding to a total braking force is equal to the target value corresponding to the target braking force, the total braking force obtained by adding a basic hydraulic braking force that is a hydraulic braking force based upon the basic hydraulic pressure to the compensation braking force comprised of a pressurizing hydraulic braking force that is a hydraulic braking force based upon at least an amount of pressurization and the target braking force determining means including hunting reducing hydraulic pressure calculating means calculating a controlling value corresponding to a hunting reducing hydraulic pressure, the controlling value obtained by applying process to the basic hydraulic pressure in order to control a variation thereof, and the target value corresponding to the target braking force is determined by use of the controlling value corresponding to the hunting reducing hydraulic pressure.

BRIEF DESCRIPTION OF THE DRAWINGS

The foregoing and additional features and characteristics of the present invention will become more apparent from the following detailed description considered with reference to the accompanying drawings, wherein:

FIGS. 4A and 4B illustrate a flow chart of a pressure difference control valve output setting process;

DETAILED DESCRIPTION

First Embodiment

Figure 1:
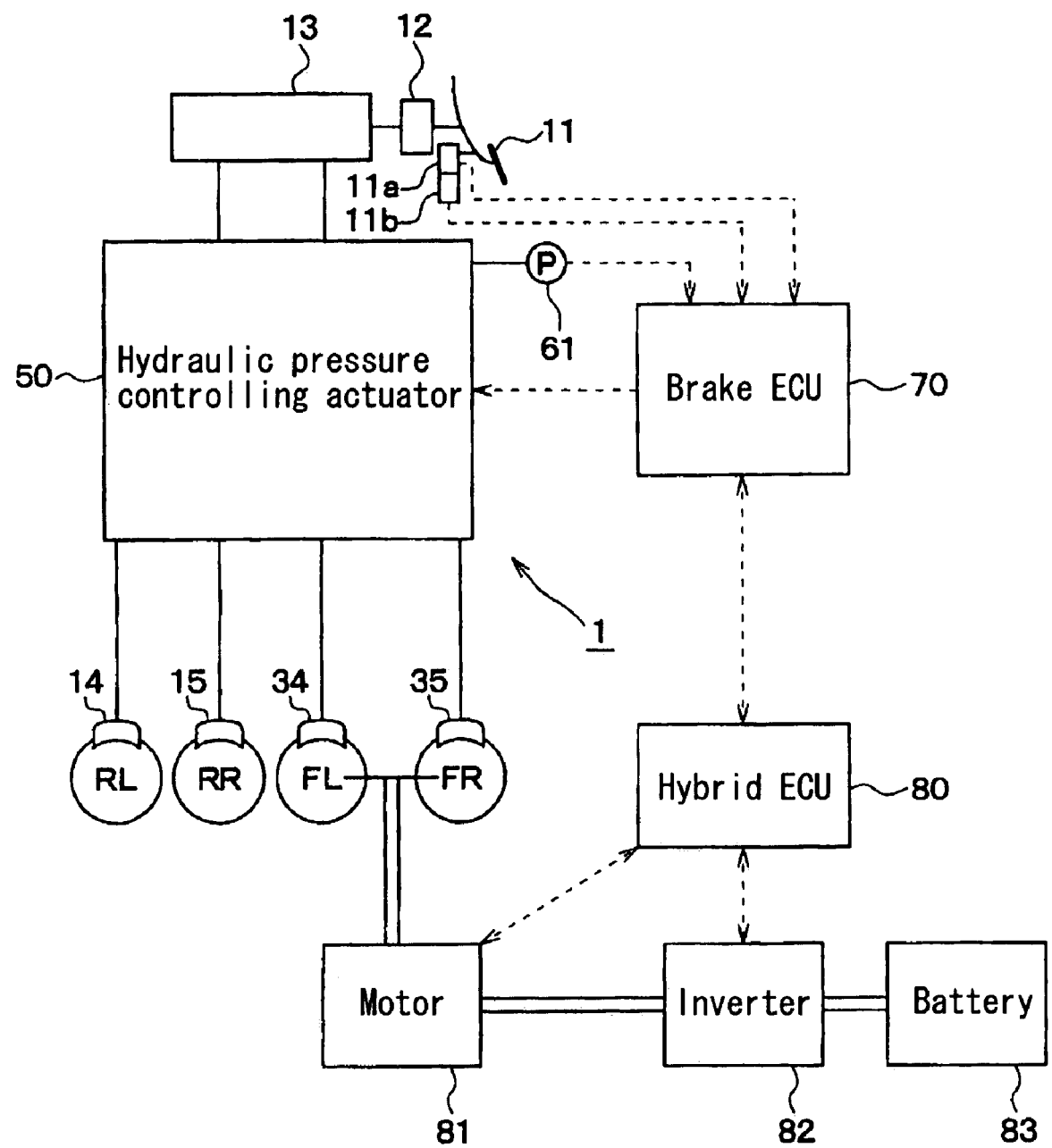
FIG. 1 illustrates a diagram indicating a block configuration of each function of a hybrid vehicle to which a control unit of the brake apparatus for the vehicle 1 is mounted.

A first embodiment of the present invention will be described in accordance with the attached drawings. FIG. 1 illustrates a diagram indicating a block configuration for each function of a hybrid vehicle to which a control unit for a brake apparatus of a vehicle 1 is mounted.

First, a hydraulic brake apparatus of the control unit for the brake apparatus of the vehicle 1 according to the embodiment will be explained. As illustrated in FIG. 1, at the control unit for the brake apparatus of the vehicle 1, a brake pedal 11, a boosting device 12, a master cylinder 13, wheel cylinders 14, 15, 34 and 35, and a hydraulic pressure controlling actuator 50 are provided so as to configure the hydraulic brake apparatus.

Figure 2:
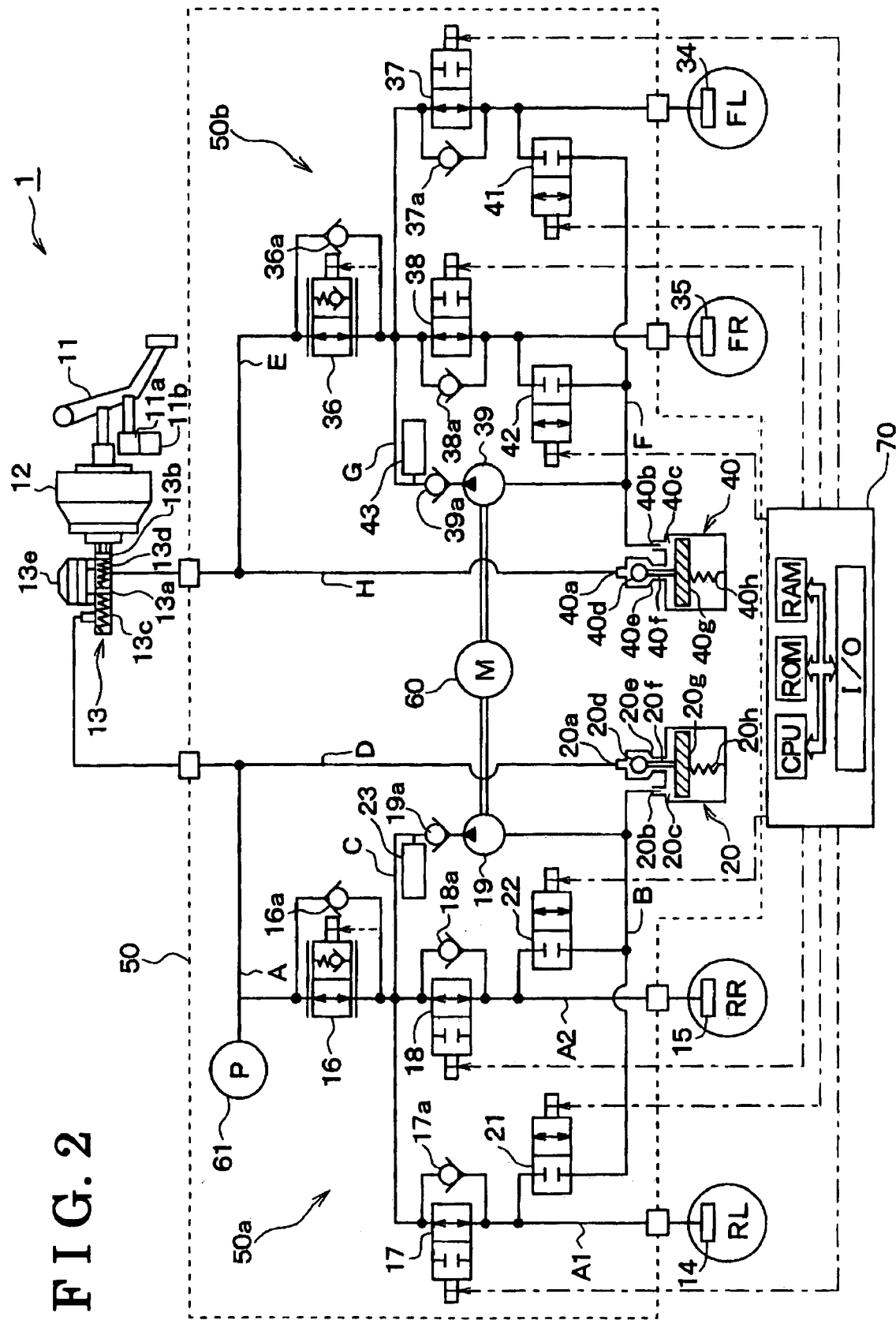
FIG. 2 illustrates a diagram indicating a structure of a hydraulic brake apparatus in detail.

The control unit of the brake apparatus for the vehicle 1 further includes a brake ECU 70. The ECU 70 functions as a part of controlling means for executing a cooperative braking control operated by the regenerative brake apparatus and the hydraulic brake apparatus in order to control a hydraulic braking force generated by the hydraulic brake apparatus and a regenerative braking force generated by the regenerative brake apparatus. FIG. 2 illustrates a diagram indicating a detail structure of each part of comprising hydraulic brake apparatus.

As illustrated in FIG. 2, a stroke sensor 11a and a stop switch 11b are connected to the brake pedal 11 serving as a brake-operating member that is depressed by a driver when the driver intends to generate a braking force. The stroke sensor 11a and the stop switch 11b generate detection signals depending on a stroke amount of the brake pedal 11. The detection signals of the stroke sensor 11a and the stop switch 11b are transmitted to the brake ECU 70 so that the brake ECU 70 can detect a depressing amount of the brake pedal 11 and an operation of the brake pedal 11.

The brake pedal 11 is connected to a boosting device 12, generating the hydraulic pressure, and to a master cylinder 13. Once the brake pedal 11 is depressed by the driver, the depression force is boosted at the boosting device 12 so as to press the master pistons 13a and 13b provided at the master cylinder 13. Thus, master cylinder hydraulic pressure is applied at same level to each of a primary chamber 13c and a secondary chamber 13d, which are comparted with the master pistons 13a and 13b.

The master cylinder 13 includes a master reservoir 13e connected to the primary chamber 13c and the secondary chamber 13d by means of paths. The brake fluid reserved in the master reservoir 13e is discharged to the master cylinder 13 through the path, and excessive brake fluid in the master cylinder 13 is sucked through the path and kept in the master reservoir 13e. When the pistons 13a and 13b are pressed, a connection between each chamber and the master reservoir 13e is cut off.

The master cylinder hydraulic pressure generated in the master cylinder is transmitted through the hydraulic pressure controlling actuator 50 to each wheel cylinder 14, 15, 34 and 35.

The hydraulic pressure controlling actuator 50 includes a first conduit system 50a and a second conduit system 50b. The first conduit system 50a controls hydraulic pressure applied to a left-rear wheel RL and a right-rear wheel RR, and the second conduit system 50b controls hydraulic pressure applied to a left-front wheel FL and a right-front wheel FR. A front-rear conduit system is comprised of a two-conduit system with the first and second conduit systems 50a and 50b.

The first and second conduit systems 50a and 50b will be explained in detail below. Because the first conduit system 50a and the second conduit system 50b have an approximately identical configuration, a configuration of the first conduit system 50a only will be explained below, and an explanation of a configuration of the second conduit system 50b will be skipped here.

The first conduit system 50a includes a conduit A through which the master cylinder hydraulic pressure is transmitted to the wheel cylinder 14 provided at the left-rear wheel RL and to the wheel cylinder 15 provided at the right-rear wheel RR. Through the conduit A, the wheel cylinder hydraulic pressure is applied to each of the wheel cylinders 14 and 15.

The conduit A includes a first pressure difference control valve 16 (e.g., pressure difference control valve) having a pressure control valve controlled to be in a connecting state and a pressure difference generating state.

A valve position of the first pressure difference control valve 16 is controlled so as to be in a connecting state while the braking apparatus is in a normal braking condition, and once an electric power is supplied to a solenoid coil of the valve, the valve position of the first pressure difference control valve 16 is controlled so as to be in a pressure difference generating state.

Further, an amount of the pressure difference generated at the first pressure difference control valve 16 corresponds to a value of the electric current supplied to the solenoid coil. The pressure difference increases in proportion to the value of the electric current.

The first pressure difference control valve 16 is in a pressure difference generating state, only when the hydraulic pressure of each wheel cylinder 14 and 15 is greater at a predetermined value than the master cylinder hydraulic pressure, the brake fluid is allowed to flow from the wheel cylinders 14 and 15 to the master cylinder 13. Thus, the hydraulic pressure in each of the wheel cylinder 14 and 15 is controlled so as not to exceed the master cylinder hydraulic pressure at a predetermined hydraulic pressure, and each conduit is thus protected.

The conduit A is branched into conduits A1 and A2 at downstream relative to the first pressure difference control valve 16. At one of the conduits A1 and A2, a first pressure-increasing valve 17 for controlling increase of the hydraulic pressure to the wheel cylinder 14 is provided. At the other of the conduits A1 and A2, a second pressure-increasing valve 18 for controlling increase of the hydraulic pressure to the wheel cylinder 15 is provided.

Each the first and second pressure-increasing valve 17 and 18 is comprised of a solenoid valve serving as a two position valve so as to be in a connecting state or a disconnecting state. When each the first and second pressure-increasing valve 17 and 18 is controlled so as to be in a connecting state, the master cylinder hydraulic pressure or a hydraulic pressure of a brake fluid discharged by the pump 19 (will be described later) is applied to each the wheel cylinder 14 and 15.

During the normal braking operation in which the brake pedal 11 is depressed by the driver, the first pressure difference control valve 16 and the first and second pressure-increasing valves 17 and 18 are normally controlled so as to be in a connecting state.

Further, a safety valve 16a is provided at the first pressure difference control valve 16 so as to be in parallel therewith, a safety valve 17a is provided at the first pressure-increasing valve 17 so as to be parallel therewith and a safety valve 18a is provided at the second pressure-increasing valve 18 so as to be in parallel therewith.

The safety valve 16a of the first pressure difference control valve 16 is provided in order to transmit the master cylinder hydraulic pressure to the wheel cylinders 14 and 15 when the brake pedal 11 is depressed by the driver while the first pressure difference control valve 16 is in a pressure difference generating state.

The safety valves 17a and 18a are provided in order to control the wheel cylinder hydraulic pressures applied to the left-rear wheel RL and the right-rear wheel RR so as to be reduced, when the brake pedal 11 is restored while each pressure-increasing valve 17 and 18 is in a disconnecting state upon an ABS control.

At the conduit A between the first pressure-increasing valve 17 and the wheel cylinder 14 and, between the second pressure-increasing valve 18 and the wheel cylinder 15 and at the conduit B serving as a pressure reducing conduit for connecting the wheel cylinder 14 and the pressure control reservoir 20 and connecting the wheel cylinder 15 and the pressure control reservoir 20, a first pressure reducing valve 21 and a second pressure reducing valve 22 are provided respectively. Each of the first pressure reducing valve 21 and the second pressure reducing valve 22, comprised of a solenoid valve, is a two position valve that can be controlled in a connecting state or a disconnecting state.

In a normal braking operation, the first and second pressure reducing valves 21 and 22 are normally controlled so as to be in a disconnecting state.

A conduit C, serving as a recycling conduit, is provided so as to connect the pressure control reservoir 20 and the conduit A serving as a main conduit. A self suction pump 19 driven by a motor 60 so as to suck the brake fluid from the pressure control reservoir 20 and discharge the brake fluid toward the master cylinder 13 or the wheel cylinders 14 and 15 is provided at the conduit C.

At a discharging port of the pump 19, a safety valve 19a is provided in order to prevent the highly pressurized brake fluid from entering into the pump 19. Further, in order to reduce a pulsating flow of the brake fluid discharged from the pump 19, a fixed displacement dumper 23 is provided on the conduit C at the side of the discharging port of the pump 19.

Further, a conduit D serving as an auxiliary conduit is provided so as to connect the pressure control reservoir 20 to the master cylinder 13. Through the conduit D, the pump 19 sucks the brake fluid from the master cylinder 13 and discharges the brake fluid to the conduit A. Thus, upon a TCS controlling operation and the ABS controlling operation, the brake fluid is supplied to the wheel cylinders 14 and 15 in order to increase the wheel cylinder hydraulic pressure at a certain wheel.

The pressure control reservoir 20 includes a reservoir hole 20a and a reservoir hole 20b, which are connected to a reservoir chamber 20c. Specifically, the pressure control reservoir 20 is connected to the conduit D through the reservoir hole 20a so as to receive the brake fluid from the master cylinder 13. The pressure control reservoir 20 is connected to the conduits B and C through the reservoir hole 20b so as to receive the brake fluid discharged from the wheel cylinders 14 and 15 and to supply the brake fluid to a suction port of the pump 19.

Below the reservoir hole 20a, a ball valve 20d is provided. A rod 20f is independently provided at the ball valve 20d. The rod 20f includes a predetermined stroke by which the ball valve 20d is vertically moved.

Further, within the reservoir chamber 20c, a piston 20g and a spring 20h are provided. The piston 20g is moved in conjunction with the rod 20f, and the spring 20h generates a force by which the piston 20g is pushed toward the ball valve 20d so that the brake fluid within the reservoir chamber 20c is pushed off.

The pressure control reservoir 20 with the abovementioned configuration has a limited brake fluid storage capacity. Specifically, once the brake fluid stored in the pressure control reservoir 20 reaches a predetermined amount, the ball valve 20d contacts a valve seat 20e so that the brake fluid does not flow into the pressure control reservoir 20 anymore. Thus, the brake fluid flowing into the pressure control reservoir 20 does not exceed an ability of the pump 19 to suck the brake fluid, and a high brake fluid pressure is not applied to the suction port side of the pump 19.

On the other hand, as mentioned above, the second conduit system 50b has an approximately identical configuration with the first conduit system 50a. Specifically, the first pressure difference control valve 16 and the safety valve 16a respectively correspond to a second pressure difference control valve 36 and a safety valve 36a. The first pressure-increasing valve 17 corresponds to a third pressure-increasing valve 37, the second pressure-increasing valve 18 corresponds to a fourth pressure-increasing valve 38, the safety valve 17a corresponds to a safety valve 37a, the safety valve 18a corresponds to a safety valve 38a, the first pressure reducing valve 21 corresponds to a third pressure reducing valve 41 and the second pressure reducing valve 22 corresponds to a fourth pressure reducing valve 42. The pressure control reservoir 20 corresponds to a pressure control reservoir 40, and each element 20a through 20h respectively corresponds to each element 40a through 40h. The pump 19 corresponds to a pump 39, the safety valve 19a corresponds to a safety valve 19a, and the dumper 23 corresponds to a dumper 43. The conduit A corresponds to a conduit E, the conduit B corresponds to a conduit F, the conduit C corresponds to a conduit G and the conduit D corresponds to a conduit H. Thus, a hydraulic conduit configuration of the control unit of the brake apparatus for the vehicle 1 is configured as mentioned above.

The hydraulic pressure controlling actuator 50 includes a master cylinder hydraulic pressure sensor 61 in order to detect a master cylinder hydraulic pressure generated within the master cylinder 13. A detection signal from the master cylinder hydraulic pressure sensor 61 is outputted to the brake ECU 70.

The brake ECU 70 is comprised of a known microcomputer having a CPU, a ROM, a RAM, an I/O and the like. The brake ECU 70 executes calculations in accordance with programs stored in the ROM.

For example, the brake ECU 70 receives a detection signal from a wheel speed sensor (not shown) for obtaining a wheel speed. The brake ECU 70 calculates a wheel speed on the basis of the signal, calculates a vehicle speed on the basis of the wheel speed and calculates a deceleration of the vehicle by applying time derivative to the vehicle speed.

On the basis of an electric signal of the brake ECU 70, the motor 60 is energized in order to operate each control valve 16-18, 21, 22, 36-38, 41, 42 and the pumps 19 and 39. Thus, the wheel cylinder hydraulic pressure generated within the wheel cylinders 14, 15, 34 and 35 are controlled.

Specifically, when the cooperative braking control is executed with the hydraulic braking force generated by the hydraulic brake apparatus and the regenerative braking force generated by the regenerative brake apparatus, the control valves 16-18, 21, 22, 36-38, 41, 42 of the hydraulic pressure controlling actuator 50 are operated respectively in accordance with the voltage applied to the motor 60 and (in accordance to) the solenoid coil for operating of the solenoid valve by means of the brake ECU 70, therefore a braking operation channel is arranged. Thus, a hydraulic pressure being set on the basis of the arranged channel for braking operation is generated at each wheel cylinder 14, 15, 34 and 35, and therefore, a braking force generated at each wheel can be controlled.

For example, when a hydraulic braking force is generated for each front wheel FL and FR, the pump 39 starts sucking and discharging the brake fluid by driving the motor 60 while the second pressure difference control valve 36 is in a pressure difference generating state. Specifically, once the motor 60 is driven, the pump 39 sucks the brake fluid in the master cylinder 13. The brake fluid is sucked by the pump 39 through the conduits H and G. Then, the pump 39 discharges the sucked brake fluid, and the brake fluid flows the conduits G and E and is provided to the wheel cylinder 34 of the front-left wheel FL and the wheel cylinder 35 of the front-right wheel FR. At this point, because a pressure difference between the master cylinder 13 and the wheel cylinders 34 and 35 can be generated by means of the pressure control valve in the second pressure difference control valve 36, the wheel cylinders 34 and 35 are pressurized so as to generate a hydraulic braking force.

Further, when the regenerative braking operation by the regenerative brake apparatus is required, a command value for the regenerative operation is outputted. The command value indicates how much regenerative braking force to be needed by the hybrid ECU 80. The command value of the regenerative braking operation can be calculated by a known cooperative braking control.

As illustrated in FIG. 1, the hybrid vehicle includes a regenerative brake apparatus and a hybrid ECU 80 for controlling the regenerative brake apparatus.

The regenerative brake apparatus includes a motor 81 connected to an axle for connecting the front-left wheel FL to the front-right wheel FR, an inverter 82 electrically connected to the motor 81 and a battery 83 electrically connected to the inverter 82. The motor 81 is, for example, an alternating current synchronous type, and a direct-current electricity is converted to an alternating-current electricity by means of the inverter 82, and such converted electricity is supplied to the motor 81. The inverter 82 converts the direct-current electricity to the alternating-current electricity on the basis of a control signal of the hybrid ECU 80 and also converts an alternating-current electricity generated by the motor 81 to a direct-current electricity so as to be charged in the battery 83.

The hybrid ECU 80 mainly controls a drive system. The hybrid ECU 80 calculates a vehicle speed on the basis of the detection signal from the wheel speed sensor (not shown), at the same time, the hybrid ECU 80 also calculates an operation amount of the accelerator on the basis of a detection signal from an accelerator operation amount sensor (not shown). The hybrid ECU 80 memorizes the calculated vehicle speed and the operation amount of the accelerator, and further monitors whether or not the battery fails, or in a fully charged state. Further, the hybrid ECU 80 calculates values used for the regenerative braking control on the basis of the memorized vehicle speed and the operation amount of the accelerator, and provides data used for the regenerative braking control to the brake ECU 70. The hybrid ECU 80 also receives data such as the command value for the regenerative braking control from the brake ECU 70.

Cooperating with the brake ECU 70, the hybrid ECU 80 executes the regenerative braking control in order to control the drive of the motor by controlling the inverter 82. Specifically, on the basis of a control signal of the hybrid ECU 80, the inverter 82 controls the operation of the motor 81, electric power is generated by driving the motor 81 by means of rotations of the front wheels FL and FR (or the axle connecting the front-left wheel to the front-right wheel), and the battery 83 is charged with the generated electric power. A braking force is generated by a resistance force of the motor 81 when the electric power is generated, and such braking force is used as a regenerative braking force.

At this point, the hybrid ECU 80 calculates an actual regenerative braking force (hereinafter referred to as a regenerative executing braking force), and the regenerative executing braking force is transmitted to the brake ECU 70. Specifically, a back electromotive force of the motor 81 is calculated by a known method, and the hybrid ECU 80 calculates a regenerative executing torque corresponding to the regenerative executing braking force on the basis of the back electromotive force generated by the motor 81.

Then the calculated regenerative executing torque is transmitted to the brake ECU 70. The hybrid ECU 80 may further convert the regenerative executing torque into a regenerative executing hydraulic pressure and transmit the hydraulic pressure to the ECU 70.

Next, an operation of the control unit of the brake apparatus for the vehicle 1 having the aforementioned configuration will be explained. Before explaining in detail, reasons for the operation will be explained first.

Figure 3:
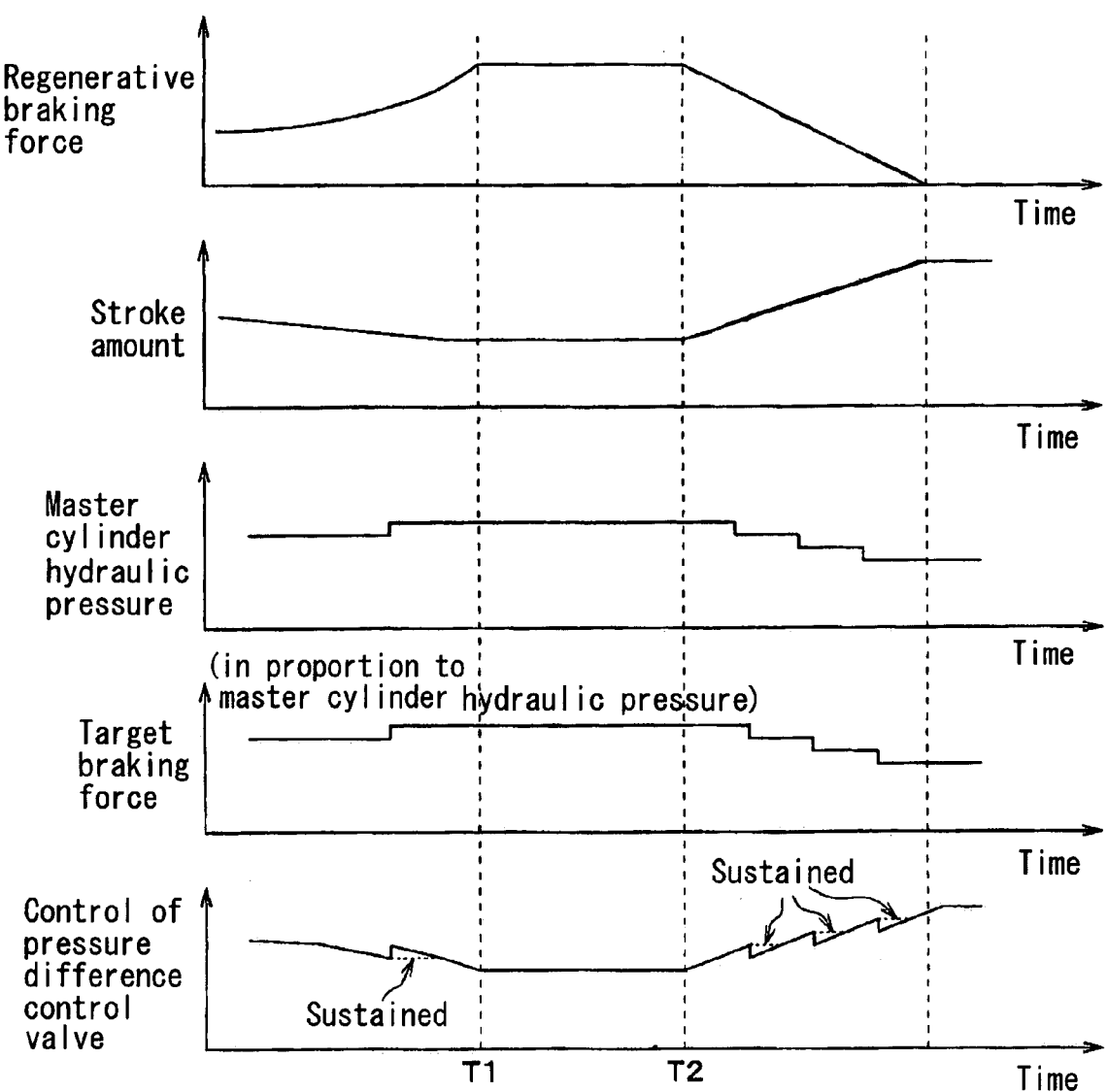
FIG. 3 illustrates a timing diagrams indicating cases where a driver intends to sustain a braking force to a certain level.

FIG. 3 illustrates timing diagrams indicating output values assuming that the driver intends to sustain a braking force at a certain level.

As illustrated in the diagrams after time T2, the regenerative braking force is reduced by replacing a part of the regenerative braking force by the hydraulic braking force, in accordance with this reduction, the pumps 19 and 39 are pressurized so that the brake fluid in the master cylinder 13 is sucked.

Thus, the master pistons 13a and 13b are moved, an occurrence that the brake pedal 11 itself is further depressed even when the brake pedal 11 is not further depressed by the driver happens. Thus, a stroke amount of the brake pedal 11 increases.

Further, because the brake fluid in the master cylinder 13 is sucked, the master cylinder hydraulic pressure is reduced. At this point, the master cylinder hydraulic pressure reduces stepped shape in the time diagram due to a friction between an inner wall of the master cylinder 13 and the master pistons 13a and 13b, a resolution of the master cylinder hydraulic pressure sensor 61 and the like.

Then, in accordance with the reduction of the master cylinder hydraulic pressure, the target braking force is reduced. Specifically, because the master cylinder hydraulic pressure is generated in accordance with the depression force of the brake pedal 11, the master cylinder hydraulic pressure is used as a parameter indicating a braking force requested by the driver.

On the basis of the detected master cylinder hydraulic pressure, the target braking force corresponding to the braking force requested by the driver is calculated, as a result, the target braking force is reduced in accordance with the reduction of the master cylinder hydraulic pressure.

As the target braking force is reduced, the pressure difference output value (an electric current value of the controlling current) of each pressure difference control valve 16 and 36, which is calculated in accordance with the calculated target braking force, is also reduced in the same manner as the target braking force. At this point, because the target braking force is reduced stepped shape in the time diagram in the same manner as the master cylinder hydraulic pressure does, by means of a method in the known art, the pressure difference output value reduces in accordance with the reduction of the target braking force reduced as indicated by a solid line in the time diagram.

Thus, in the known art, the generated wheel cylinder hydraulic pressure varies stepped shape in the time diagram, and thus the driver may feel a poor brake feeling.

According to the control unit of the brake apparatus for the vehicle 1 in the embodiment, as indicated with a dashed line in the time diagram, in accordance with the reduction of the target braking force caused by the suction of the brake fluid from the master cylinder 13, the pressure difference output value of each pressure difference control valve 16 and 36 is sustained so as not to be reduced.

Conversely, another effect can be obtained. Specifically, before the time T1 in which the braking force requested by the driver is increasing, the hydraulic braking force is reduced in accordance with the increase of the regenerative braking force, and the master cylinder hydraulic pressure is increased because a consumption amount of the brake fluid in the master cylinder 13 is reduced. Accordingly, the stroke amount of the brake pedal 11 may be reduced against the depression force applied by the driver.

In this case, even when the brake pedal 11 is not further depressed by the driver, the master cylinder hydraulic pressure is increased, and the target braking force is increased. Then, as indicated by a solid line in the time diagram, the pressure difference output value increases in accordance with the increase of the target braking force. Thus, the generated wheel cylinder hydraulic pressure varies, forming a stepped shape in the time diagram, and the driver may feel a poor brake feeling.

In this case, as indicated by the dashed line in the time diagram, in accordance with the increase of the target braking force caused by the reduction of the consumption amount of the brake fluid in the master cylinder 13, the pressure difference output value of each pressure difference control valve 16 and 36 is sustained so as not to increase.

In order to sustain the pressure difference output value of the pressure difference control valves 16 and 36, according to the control unit of the brake apparatus for the vehicle 1 of the embodiment according to the present invention, the brake ECU 70 executes a pressure difference control valve output setting process as one of the regenerative cooperative braking control.

The control unit of the brake apparatus for the vehicle 1 in the embodiment executes a regenerative cooperative braking control using the hydraulic braking force generated by the hydraulic brake apparatus together with the regenerative braking force generated by the regenerative brake apparatus, however, because the configuration of the regenerative cooperative braking control is roughly identical to that in the known art, only the pressure difference control valve output setting process, which is a characteristic feature of the present invention, will be explained here.

Figure 4A:
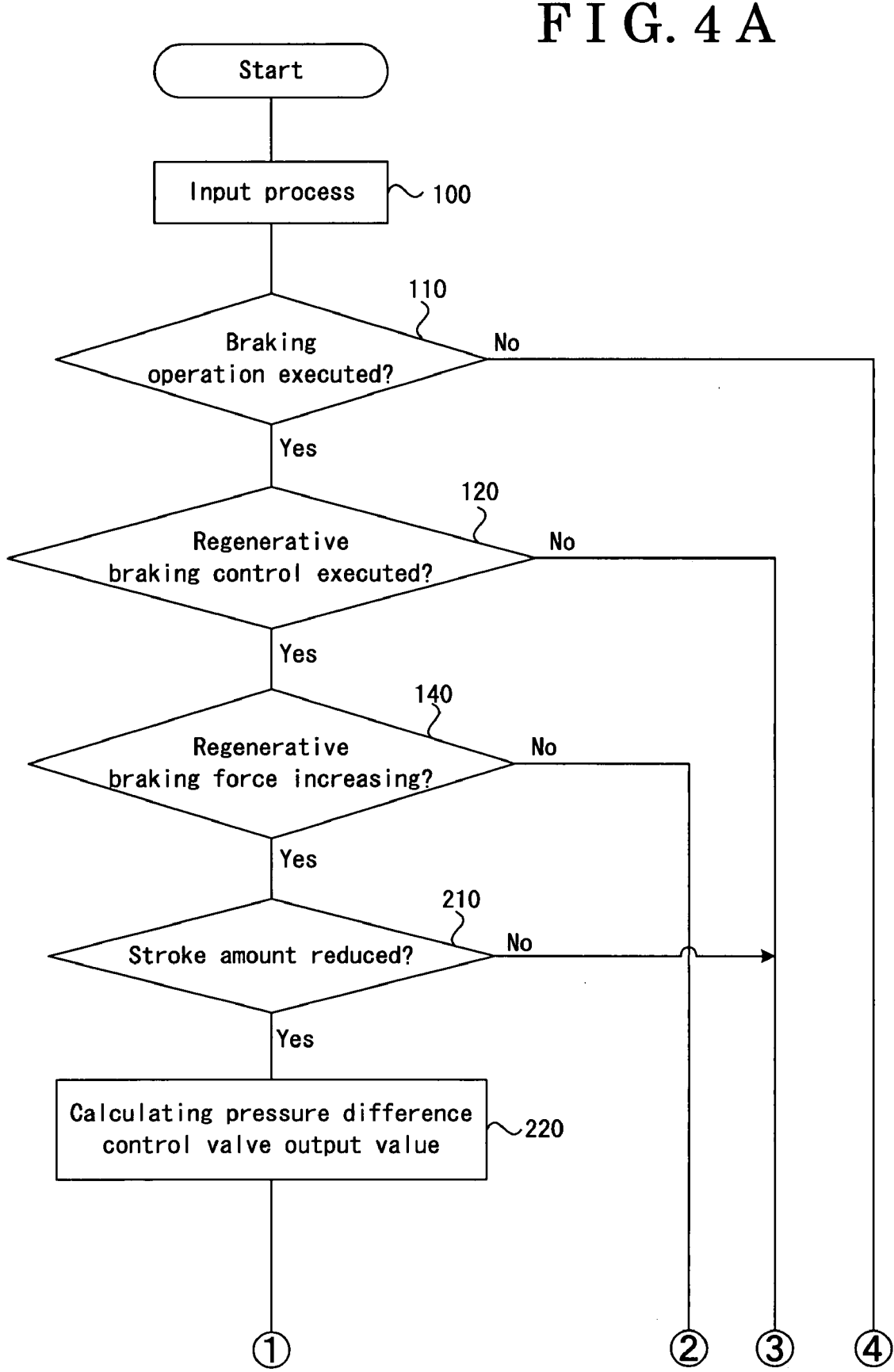
Figure 5:
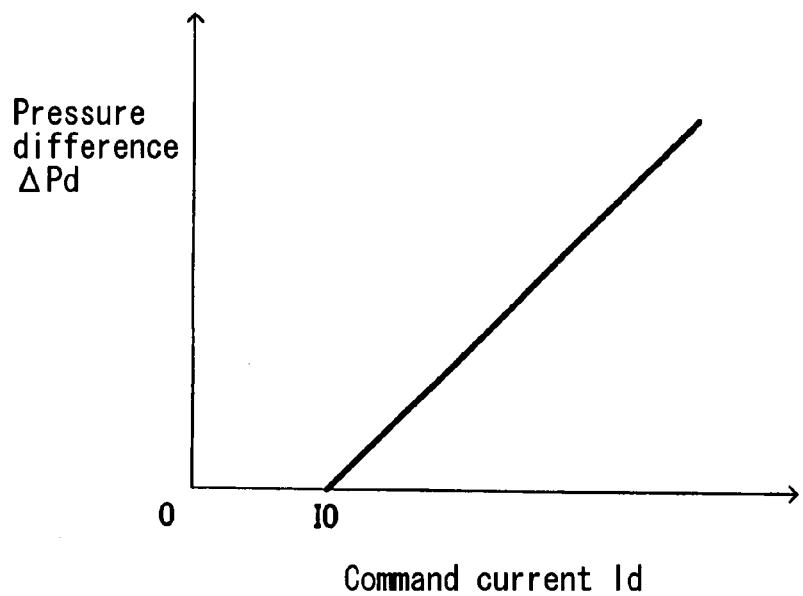
FIG. 5 illustrates a graph indicating a relation between a command current and a pressure difference.

FIGS. 4A and 4B illustrates a flow chart for explaining the pressure difference control valve output setting process. The pressure difference control valve output setting process illustrated in the flow chart is executed following the program memorized in the ROM of the brake ECU 70.

For example, when an ignition switch is turned on, the pressure difference control valve output setting process is executed on a predetermined calculation cycle. Each step in the flow chart corresponds to each means for executing each process.

In Step 100, an input process is executed. Specifically, in Step 100, a stroke (depression amount) of the brake pedal 11 depressed by the driver is calculated on the basis of the detection signal from the stroke sensor 11a, the depression of the brake pedal 11 is detected on the basis of the detection signal from the stop switch 11b, a vehicle speed V is calculated on the basis of a detection signal from the wheel speed sensor, the master cylinder hydraulic pressure is calculated by inputting the detection signal from the master cylinder hydraulic pressure sensor 61, various data such as the regenerative executing braking torque or the regenerative executing hydraulic fluid pressure, which need to be used for the regenerative braking control, are inputted from the hybrid ECU 80.

The process goes to Step 110. In step 110, it is determined whether or not the braking operation is executed. The braking operation is determined on the basis of the detection signal from the stop switch 11b, however, it may be determined on the basis of the stroke sensor 11a alternatively. When it is determined that the braking operation is executed, the process goes to Step 120. When it is determined that the braking operation is not executed, because there is no need to control the pressure difference control valves 16 and 36, the process is terminated.

In Step 120, it is determined whether or not the regenerative braking control is executed. For example, an address at which the regenerative braking control is executed or not is memorized is set at the RAM of the hybrid ECU 80, and the regenerative braking control is determined on the basis of whether or not the address in the RAM is set or reset.

The brake ECU 70 itself may memorize the output of the regenerative braking control command value, and the execution of the regenerative braking control may be determined on the basis of whether or not the regenerative executing braking torque is generated.

When it is determined that the regenerative braking control is not executed, because the problems related to the replacement the regenerative braking force with the hydraulic braking force do not occur, the target braking force corresponding to the braking force requested by the driver is calculated in Step 130, and the pressure difference output value (the electric current value of the controlling current) of each pressure difference control valve 16 and 36 is calculated on the basis of the calculated target braking force.

The brake ECU 70 that executes this process (Step 130) together with processes in a Step 160 and a Step 220 corresponds to target braking force calculating means.

The pressure difference output value of each pressure difference control valve 16 and 36, on the basis of the braking force requested by the driver, is calculated on the basis of the detection signal of the master cylinder hydraulic pressure sensor 61.

Because the master cylinder hydraulic pressure is generated in accordance with the depression force applied to the brake pedal 11, the master cylinder hydraulic pressure is used as a parameter indicating the braking force requested by the driver. Then, the target braking force corresponding to the braking force requested by the driver is calculated on the basis of the detected master cylinder hydraulic pressure, and when the master cylinder hydraulic pressure boosted by the boosting device 12 reaches the target braking force, the pressure difference output value is set to "0" (the electric current value of the controlling current is "0"), and when a master cylinder hydraulic pressure boosted by the boosting device 12 does not reach the target braking force, the pressure difference output value is set to a value by which a pressure difference corresponding to the shortage to which the target braking force is generated.

On the other hand, when the regenerative braking control is executed, the process goes to Step 140. In Step 140, it is determined whether or not the regenerative braking force is increasing. The brake ECU 70 executing this determining process corresponds to regenerative braking force determining means.

The brake ECU 70 determines whether or not the regenerative braking force is increased on the basis of the determination whether or not the regenerative braking command value outputted by itself is increased.

When it is detected in Step 140 that the regenerative braking force is reduced, the process goes to Step 150. In Step 150, it is determined whether or not the stroke amount of the brake pedal 11 is increased. The brake ECU 70 executing this determining process corresponds to operation amount increase determining means.

When it is determined that the stroke amount of the brake pedal 11 is increased, the process goes to the Step 160 and calculates the pressure difference control valve output value. The Brake ECU 70 executing this process corresponding to first pressure difference output value calculating means. When it is determined that the stroke amount of the brake pedal 11 is not increased, the process goes to Step 130 and calculates the pressure difference control valve output value. When the pressure difference control valve output is calculated in Step 160, the process goes to Step 170. In Step 170, it is determined whether or not the pressure difference output value of each pressure difference control valve 16 and 36 is smaller than a previous pressure difference output value (previous output value). The brake ECU 70 executes this determination by comparing the current output value to the previous output value corresponds to first comparing means. The previous pressure difference output value is memorized in the RAM of the brake ECU 70 in Step 200, which will be described later. The memorized previous pressure difference output value is read out and used in Step 170.

Thus, in Step 150, it is determined that the brake pedal 11 increases, and in Step 170, it is determined that the current pressure difference control valves 16 and 36 is smaller than the previous pressure different output value.

Specifically, once the brake fluid is sucked from the master cylinder 13 in order to replace the regenerative braking force with the hydraulic braking force, the master cylinder hydraulic pressure is reduced, as a result the target braking force is also reduced. In accordance with those reductions, the pressure difference output value of each pressure difference control valve 16 and 36 may be reduced.

Thus, when it is detected whether or not the brake fluid in the master cylinder 13 is sucked in order to replace the regenerative braking force with the hydraulic braking force on the basis of the pressure difference output value of each pressure difference control valve 16 and 36, such suction should be differentiated from the case in which the pressure difference output value of each pressure difference control valve 16 and 36 is reduced when the driver reduces the depression force applied to the brake pedal 11.

Thus, when it is determined in Step 150 that the stroke amount of the brake pedal 11 increases, and is determined in Step 170 that the pressure difference output value of each pressure difference control valve 16 and 36 is smaller than the previous pressure difference output value, the reduction occurs due to the suction of the brake fluid from the master cylinder 13 in order to replace the regenerative braking force with the hydraulic braking force.

Thus, when it is determined in Step 170 that the pressure difference output value of each pressure difference control valve 16 and 36 is lower than the previous pressure difference output value, the process goes to Step 180, and the previous pressure difference output value of each pressure difference control valve 16 and 36, not the current value, is set to a pressure difference output value to be outputted. The brake ECU 70 executing the above process corresponds to decrease prohibiting control means setting the pressure difference output value by which the wheel cylinder hydraulic pressure is not reduced, and also corresponds first pressure difference output value changing means setting a pressure difference output value to be equal to or greater than the previous pressure difference output value.

Then the process goes to Step 190. In Step 190, the electric current of the controlling current corresponding to the determined pressure difference output value is outputted to the solenoid coil of each pressure difference control valve 16 and 36, and the process goes to Step 200. In Step 200, the determined pressure difference output value is memorized in the RAM of the brake ECU 70 as a previous pressure difference output value, and the process is terminated.

In this configuration, when the current pressure difference output value of each pressure difference control valve 16 and 36 becomes smaller than the previous pressure difference output value because of the suction of the brake fluid from the master cylinder 13 in order to replace the regenerative braking force with the hydraulic braking force, the pressure difference output value can be sustained so as not to be smaller than the previous pressure difference output value.

Thus, the driver's rake feeling can be improved because of the generated wheel cylinder hydraulic pressure varying, forming a stepped shape in the time diagram.

On the other hand, when it is determined in Step 140 that the regenerative braking force is increasing, the process goes to Step 210. In Step 210, it is determined whether or not the stroke amount of the brake pedal 11 is reduced. The brake ECU 70 executing this process corresponds to operation amount decrease determining means.

In Step 210, when it is determined that the stroke amount of the brake pedal is reduced, the process goes to Step 220 and the pressure difference control valve output value is calculated. When it is determined that the stroke amount of the brake pedal is not reduced, the process goes to Step 230 and the pressure difference control valve output value is calculated. The ECU 70 executing this process corresponds to second pressure difference output value calculating means.

After the pressure difference control valve output value is calculated In Step 220, the process goes to Step 230. In Step 230, it is determined whether or not the pressure difference output value of each pressure difference control valve 16 and 36 calculated in Step 210 is greater than the previous pressure difference output value (previous output value).

The brake ECU 70 executes this determination corresponding to second comparing means determining whether or not the target braking force increases by comparing the current pressure difference output value to the previous output value. The previous pressure difference output value is memorized in the RAM of the brake ECU in Step 200, and the memorized previous pressure difference output value is read out in Step 230

Thus, in Steps 210 and 230, it is determined whether or not the stroke amount of the brake pedal 11 is reduced, and the current pressure difference output value of each pressure difference control valve 16 and 36 is higher than the previous pressure difference output value.

Specifically, in accordance with the increase of the regenerative braking force, the hydraulic braking force is reduced, and the consumption of the brake fluid in the master cylinder 13 is reduced. In this situation, the master cylinder hydraulic pressure increases, and the target braking force also increases. In accordance with such increases, the pressure difference output value of each pressure difference control valve 16 and 36 may be increased. Thus, the reduction of the hydraulic braking force in accordance with the increase of the regenerative braking force is detected on the basis of the pressure difference output value of each pressure difference control valve 16 and 36. However, this reduction may be differentiating from the case where the pressure difference output value of each pressure difference control valve 16 and 36 increases when the depression force applied to the brake pedal 11 is increased. Thus, when it is determined in Step 210 that the stroke amount of the brake pedal 11 is decreased, and it is determined in Step 230 that the pressure difference output value of each pressure difference control valve 16 and 36 is greater than the previous pressure difference output value, the increase of the pressure difference is caused by the reduction of the hydraulic braking force in accordance with the increase of the regenerative braking force.

When it is determined in Step 230 that the pressure difference output value of each pressure difference control valve 16 and 36 is greater than the previous pressure difference output value, the process goes to Step 240. In Step 240, the pressure difference output value is set to a value by which the previous pressure difference output value is outputted, not set to the current pressure difference output value. The brake ECU 70 executing this process corresponds to increase prohibiting control means setting the pressure difference output value by which the wheel cylinder hydraulic pressure is not increased, and also corresponds to second pressure difference output value changing means setting the pressure difference output value to be equal to or less than the previous output value.

Then, the process goes to Step 190. In Step 190, the electric current value of the controlling current, which corresponds to the determined pressure difference output value, is outputted to the solenoid coil of each pressure difference control valve 16 and 36, and then the process goes to Step 200. In Step 200, the determined pressure difference output value is memorized in the RAM of the brake ECU 70 as a previous pressure difference output value, and then the process is terminated.

In this configuration, when the current pressure difference output value of each pressure difference control valve 16 and 36 increases to be greater than the previous pressure difference output value due to the decrease of the hydraulic braking force in accordance with the increase of the regenerative braking force, the pressure difference output value is sustained so as not to be greater than the previous pressure difference output value. Thus, the poor brake feeling caused by the brake fluid varies forming a stepped shape can be improved.

As explained above, according to the control unit of the brake apparatus for the vehicle 1 in the embodiment, when the stroke amount of the brake pedal 11 is increased, and the pressure difference output value of each pressure difference control valve 16 and 36 is smaller than the previous pressure difference output value. The increased stroke amount of the brake pedal 11 is caused by the suction of the brake fluid from the master cylinder 13 in order to replace the regenerative braking force with the hydraulic braking force. In this case, the pressure difference output value is sustained to the previous value.

In this way, when the current pressure difference output value of each pressure difference control valve 16 and 36 is smaller than the previous pressure difference output value due to the suction of the brake fluid from the master cylinder 13 in order to replace the regenerative braking force with the hydraulic braking force, the pressure difference output value is sustained so as not to be smaller than the previous pressure difference output value. Thus, the poor brake feeling caused by the wheel cylinder hydraulic pressure that varies, forming a stepped shape, can be improved.

Further, when the stroke amount of the brake pedal 11 is reduced, and the current pressure difference output value of each pressure difference control valve 16 and 36 is greater than the previous pressure difference output value, this is caused by the reduction of the hydraulic braking force in accordance with the increase of the regenerative braking force. In this case, the pressure difference output value is sustained to be the previous output value.

In this configuration, when the current pressure difference output value of each pressure difference control valve 16 and 36 increases to be greater than the previous pressure difference output value due to the decrease of the hydraulic braking force in accordance with the increase of the regenerative braking force, the pressure difference output value is sustained so as not to be greater than the previous pressure difference output value. Thus, the poor brake feeling caused by the wheel cylinder hydraulic pressure that varies forming a stepped shape can be improved.

Second Embodiment

A second embodiment of the present invention will be explained. A control unit of the brake apparatus for the vehicle 1 in the second embodiment is similar to that in the first embodiment. Specifically, in the second embodiment, because only the configuration of the pressure difference control valve output setting process executed by the brake ECU 70 is different from that in the first embodiment, explanations of configurations of other components will be omitted.

In the first embodiment, the previous output value is set to the pressure difference output value in Step 180 indicated in the flow chart of the pressure difference control valve output setting process illustrated in FIGS. 4A and 4B, however, in the second embodiment, the pressure difference output value may be set to be greater than the previous output value as long as the pressure difference output value is lower than the previous value. In this case, same effects can be obtained.

When the pressure difference output value is increased from the previous output value, it may become greater than the value calculated in Step 160. Thus, an increasing slope of previous pressure difference output values may be considered. For example, a further previous pressure output value is memorized in the RAM together with the previous pressure difference output value, a pressure difference output value is obtained by adding a difference value to the previous value, a difference value being a difference between the above two values or being a value obtained by multiplying the difference between the two values by a fixed ratio (e.g., ½).

In the first embodiment, in Step 240 indicated in the flow chart of the pressure difference control valve output setting process illustrated in FIGS. 4A and 4B, the pressure difference output value is set to the previous output value, however, in the second embodiment, the previous output value may be decreased as long as the pressure difference output value is not greater than the previous value. In this case, same effects can be obtained.

When the pressure difference output value is set to be smaller than the previous value, it may be smaller than the pressure difference output value calculated in Step 220. Thus an increasing slope of previous pressure difference output values may be considered.

For example, a further previous pressure output value is memorized in the RAM together with the previous pressure difference output value, and a pressure difference output value is obtained by subtracting a difference value from the previous value, a difference value being a difference between the above two values or being a value obtained by multiplying the difference between the two value by a fixed ratio (e.g., ½)

Other Embodiment

In the abovementioned embodiments, the motor 81 is directly connected to the wheels FL and FR or the axle thereof, however, a decelerator maybe provided between the motor 81 and the wheels FL and FR or the axle thereof. In this configuration, the present invention can be applied.

Further, in the present invention, the controlling means is comprised of the brake ECU 70 and the hybrid ECU 80, however, the controlling means may include other ECUs.

The brake ECU 70 and the hybrid ECU 80 may be combined to be a single ECU. Further, an operation parts of the brake ECU 70 and the hybrid ECU 80 executing the abovementioned function may partially be provided at other ECUs.

In the embodiments, the brake pedal 11 is provided as the brake-operating member, however, a brake lever may be provided alternatively. Further, the braking force requested by the driver in accordance with the operation of the brake-operating member is calculated on the basis of the detect signal from the master cylinder hydraulic pressure sensor 61, however, this may be calculated on the basis of other means that can generate an output corresponding to the detecting signal of the braking force requested by the driver, for example a detect signal of a depression force sensor, by which a depression force of the brake pedal is detected.

In the above embodiments, the stroke sensor 11a is used as the brake operation detecting means, however, another means such as an on/off signal of a brake switch, by which it can be detected that the brake before the brake pedal 11 is operated before an invalid stroke, can be used Further, in the above embodiments, the pressure difference control valves 16 and 36 are used as a two position valve, however, a linear valve or a reverse connection proportioning valve may be used alternatively as long as it can generate the pressure difference by which the wheel cylinder hydraulic pressure becomes greater than the master cylinder hydraulic pressure.

Third Embodiment (Control of Characteristic of Wheel Cylinder Hydraulic Pressure)

Described below is an outline of the control of characteristic of wheel cylinder hydraulic pressure, which is executed by the brake apparatus (the control unit of the brake apparatus for the vehicle) according to a third embodiment. Generally, there is a target characteristic (target braking force characteristic) for the characteristic of the braking force (total braking force) applied to the vehicle relative to a depression force applied to the brake pedal. Therefore, in the control unit of the brake apparatus for the vehicle, which generates braking force only by use of the hydraulic braking force, there is a target characteristic for the characteristic of the wheel cylinder pressure relative to the depression force applied to the brake pedal.

Figure 6:
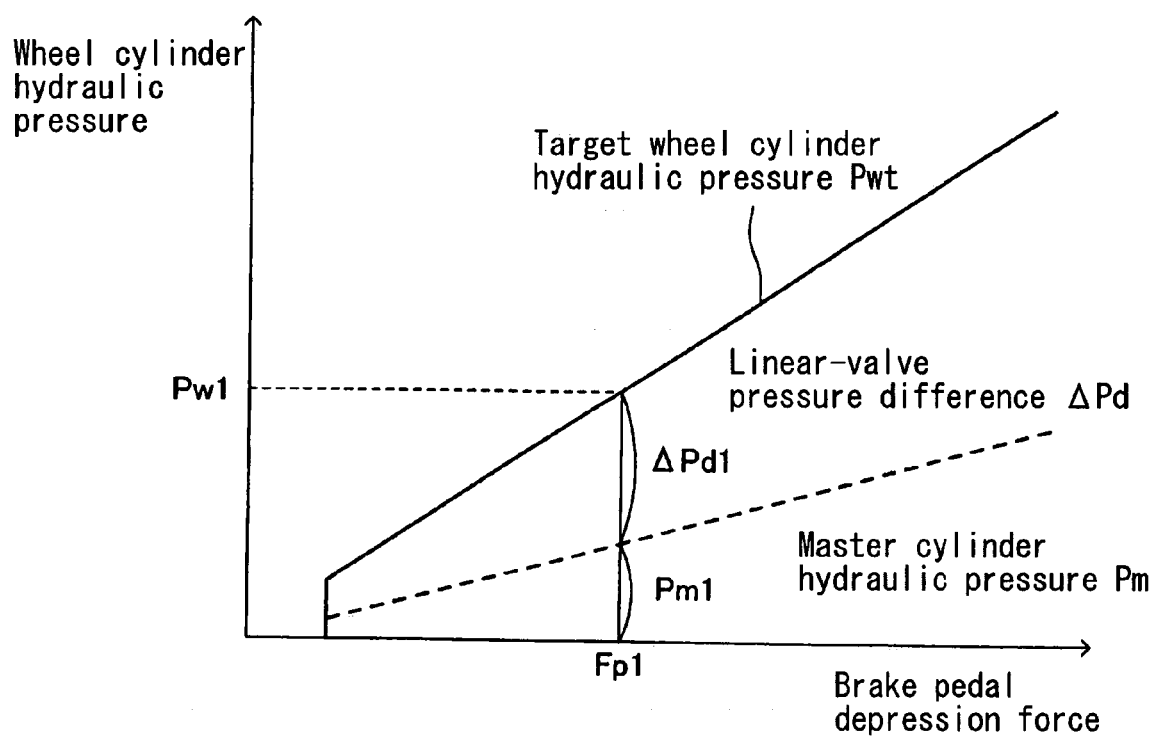
FIG. 6 illustrates a graph indicating a depression force applied to a brake pedal, a master cylinder hydraulic pressure and a target wheel cylinder hydraulic pressure.

The solid line in FIG. 6 indicates the characteristic of a target value of the wheel cylinder hydraulic pressure (target wheel cylinder hydraulic pressure Pwt) relative to the depression force applied to the brake pedal. On the other hand, the broken line in FIG. 6 indicates the characteristic of the master cylinder hydraulic pressure Pm (corresponding to the basic hydraulic pressure Pm) outputted by the master cylinder (corresponding to the basic hydraulic pressure generating means), relative to the depression force applied to the brake pedal.

As is apparent from the comparison between the solid line and the broken line in FIG. 6, in the control unit of the brake apparatus for the vehicle, the boosting characteristic of the vacuum booster VB is set so that the master cylinder hydraulic pressure Pm, relative to the brake pedal pressure, is lower than a target wheel cylinder hydraulic pressure Pwt by a specified amount.

According to the third embodiment of the present invention, the control unit of the brake apparatus for the vehicle compensates the shortage of the master cylinder hydraulic pressure Pm (corresponding to the basic hydraulic pressure) relative to the target wheel cylinder hydraulic pressure Pwt by a linear-valve pressure difference $\Delta Pd$ (e.g., amount of pressurization) (=$\Delta Pdf$=$\Delta Pdr$). The linear-valve pressure difference $\Delta Pd$ corresponds to a compensation braking force. Accordingly, the characteristic of the wheel cylinder hydraulic pressure Pw (=Pm+$\Delta Pd$ "a value corresponding to the total braking force"), which is obtained by adding the linear-valve pressure difference $\Delta Pd$ (amount of pressurization) to the master cylinder hydraulic pressure Pm (basic hydraulic pressure), agrees with the characteristic of the target wheel cylinder hydraulic pressure Pwt ("value corresponding to the target braking force") indicated by the solid line in FIG. 6.

For example, when the depression force applied to the brake pedal is a value Fp1, as shown in FIG. 6, the command current Id to each normally open linear solenoid valve PC1 and PC2 is controlled so that the linear-valve pressure difference $\Delta Pd$ agrees with a value $\Delta Pd1$ (=Pw1–Pm1) that is obtained by subtracting the master cylinder hydraulic pressure Pm (=Pm1) corresponding to the value Fp1 from the target wheel cylinder hydraulic pressure Pwt (=Pw1) corresponding thereto.

Thus, the greater the depression force applied to the brake pedal is (in other words, the greater the target wheel cylinder hydraulic pressure Pwt is), the greater linear-valve pressure difference $\Delta Pd$ becomes.

This is because the increasing slope of the target wheel cylinder hydraulic pressure Pwt relative to the increase of the depression force applied to the brake pedal is larger than the increasing slope of the master cylinder hydraulic pressure Pm relative to the increase of the depression force applied to the brake pedal.

Here, the hydraulic braking force based upon the master cylinder hydraulic pressure Pm corresponds to a basic hydraulic pressure braking force corresponds to a basic hydraulic braking force, and the hydraulic braking force based upon the linear-valve pressure difference $\Delta Pd$ corresponds to a pressurizing hydraulic braking force (=the compensation braking force). Thus, the characteristic of the total braking force (=the basic hydraulic pressure braking force+ the pressurizing hydraulic braking force (=compensation braking force)) relative to the depression force applied to the brake pedal agrees with the target braking force characteristic.

(Reducing Master Cylinder Hydraulic Pressure Hunting)

According to the embodiment of the present invention, the target wheel cylinder hydraulic pressure Pwt is determined on the basis of the master cylinder hydraulic pressure Pm ("value corresponding to the basic hydraulic pressure").

As a matter of convenience, in this embodiment, the target wheel cylinder hydraulic pressure Pwt is determined by using the master cylinder hydraulic pressure Pm itself (e.g., the target wheel cylinder hydraulic pressure Pwt is set to a value which is in proportion to the master cylinder hydraulic pressure Pm).

In this case, according to the control unit of the brake apparatus for the vehicle having the in-line system, even when the driver intends to sustain the brake pedal operation, an occurrence in which the master cylinder hydraulic pressure Pm varies, and such variation continues (this occurrence is called as "master cylinder hydraulic pressure hunting") occurs.

FIG. 7 illustrates time diagram indicating examples of variations of the master cylinder hydraulic pressure Pm, the target wheel cylinder hydraulic pressure Pwt and the command current ID (e.g., linear-valve pressure difference $\Delta Pd$) while the master cylinder hydraulic pressure hunting occurs.

In the diagram, the driver starts applying the depression force from the beginning to the brake pedal at a certain point before time tA and gradually increases the depression force, and from a point immediately before the tA (depression force sustaining start point), the driver starts sustaining the depression force applied to the brake pedal to be stable.

One of mechanisms of generation of the master cylinder hydraulic pressure hunting will be explained below. Before the depression force sustaining start point, the master cylinder hydraulic pressure Pm increases in accordance with the increase of the depression force applied to the brake pedal. In accordance with the increase of the master cylinder hydraulic pressure Pm, the target wheel cylinder hydraulic pressure Pwt, which is determined in proportion to the master cylinder hydraulic pressure Pm, is increased as a result, the linear-valve pressure difference $\Delta Pd$ increases as mentioned above.

In the process in which the linear-valve pressure difference $\Delta Pd$ increases, a flow speed of the brake fluid flowing through the pressure difference control valves 16 and 36 into a discharge port (first and second ports) of the master cylinder (hereinafter referred to as an inlet velocity) is sustained so as to be smaller than a flow speed of the brake fluid flowing from the discharge port of the master cylinder through each reservoir RS1 and RS2 into a suction port of each pump HP1 and HP2 (hereinafter referred to as an exit velocity).

After the depression force sustaining start point, because the depression force applied to the brake pedal is sustained to a certain level, the master cylinder hydraulic pressure Pm is also sustained to a certain level.

Accordingly, the target wheel cylinder hydraulic pressure Pwt and the linear-valve pressure difference $\Delta Pd$ are also sustained to certain levels. When the linear-valve pressure difference $\Delta Pd$ is sustained to the certain level, the inlet velocity becomes equal to the exit velocity.

Thus, before the depression force sustaining start point, the inlet velocity is lower than the exit velocity, however, after the depression force sustaining start point, the inlet velocity becomes equal to the exit velocity.

Thus, because this change happens rapidly, the inlet velocity apparently increases relative to the exit velocity, as a result, from the depression force sustaining start point to the point immediately after the depression force sustaining start point (time tA), the master cylinder hydraulic pressure Pm further increases.

Thus, during the period from the depression force sustaining start point to the time tA, both the target wheel cylinder hydraulic pressure Pwt and the linear-valve pressure difference $\Delta Pd$ increase. When the linear-valve pressure difference $\Delta Pd$ increases, the inlet velocity becomes lower than the exit velocity as mentioned above. Thus, after the time tA, the master cylinder hydraulic pressure Pm decreases.

Thus, after the time tA, because the master cylinder hydraulic pressure Pm is decreased, the target wheel cylinder hydraulic pressure Pwt and the linear-valve pressure difference $\Delta Pd$ are also decreased. In the process in which the linear-valve pressure difference $\Delta Pd$ is decreased, the inlet velocity is sustained to be larger than the exit velocity.

Thus, the master cylinder hydraulic pressure Pm starts increasing again. In accordance with this increase, the target wheel cylinder hydraulic pressure Pwt and the linear-valve pressure difference $\Delta Pd$ are also increased, as a result, the inlet velocity becomes lower than the exit velocity, and the master cylinder hydraulic pressure Pm starts decreasing again.

As those acts are repeated, the occurrence where the master cylinder hydraulic pressure Pm repeatedly varies within a hunting range W. This is the master cylinder hydraulic pressure hunting.

According to the braking apparatus of the third embodiment having the in-line system, when the target wheel cylinder hydraulic pressure Pwt is determined by using the master cylinder hydraulic pressure Pm itself, hunting is generated in the master cylinder hydraulic pressure (master cylinder hydraulic pressure hunting). In order to reduce the generation of the master cylinder hydraulic pressure hunting, according to the control unit of the brake apparatus for the vehicle of the third embodiment, the target wheel cylinder hydraulic pressure Pwt is set by use of a value that is obtained by applying hysteresis to the master cylinder hydraulic pressure Pm (hereinafter referred to also as a master cylinder hydraulic pressure with hysteresis Pmh), instead of the master cylinder hydraulic pressure Pm itself. This master cylinder hydraulic pressure with hysteresis Pmh corresponds to a value corresponding to a hunting reducing basic hydraulic pressure (e.g., hunting reducing hydraulic pressure).

A calculation process of the master cylinder hydraulic pressure with hysteresis Pmh according to the third embodiment will be explained in accordance with FIGS. 8 and 9.

Figure 8:
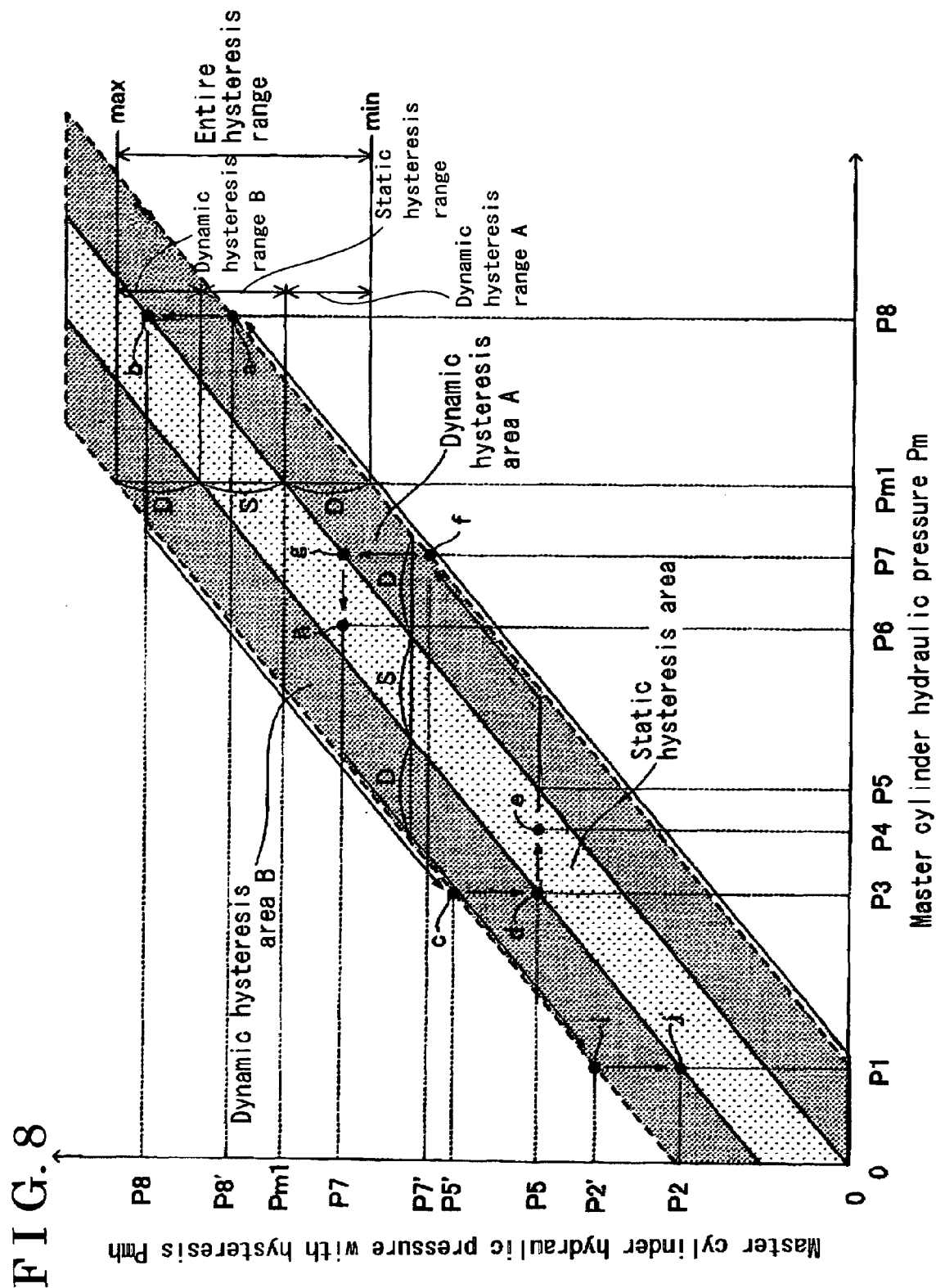
FIG. 8 illustrates a graph indicating a relation between the master cylinder hydraulic pressure and a hysteresis range of the master cylinder hydraulic pressure with hysteresis, and a relation between the master cylinder hydraulic pressure and the master cylinder hydraulic pressure with hysteresis when the master cylinder hydraulic pressure varies in a certain pattern.
Figure 9:
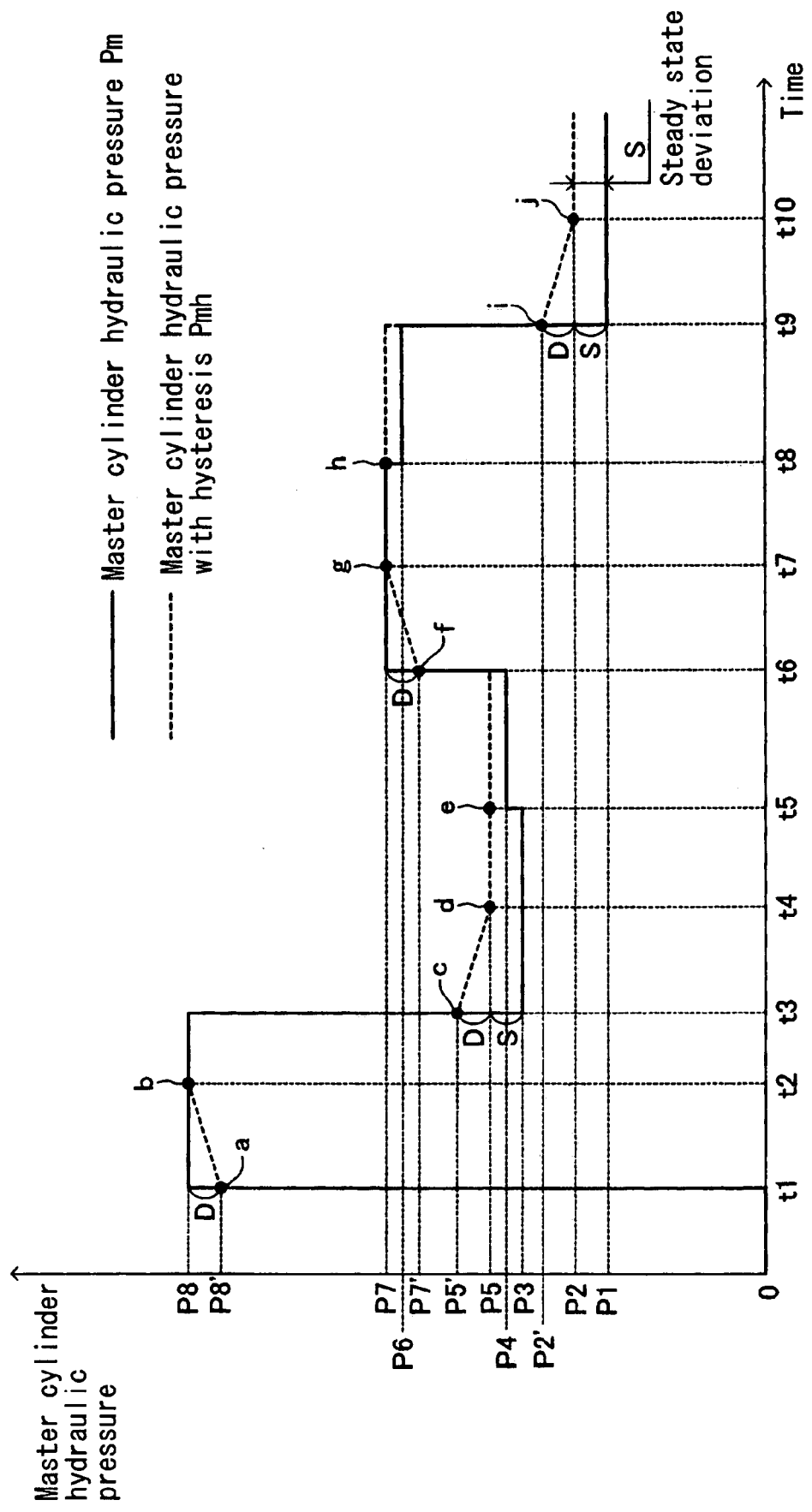
FIG. 9 illustrates a time diagram indicating the variation of the master cylinder hydraulic pressure with hysteresis when the master cylinder hydraulic pressure varies in a certain pattern.

FIG. 8 illustrates a graph indicating an example of a relation between the master cylinder hydraulic pressure Pm and a hysteresis range of the master cylinder hydraulic pressure with hysteresis Pmh, and an example of a relation between the master cylinder hydraulic pressure Pm and the master cylinder hydraulic pressure with hysteresis Pmh when the master cylinder hydraulic pressure Pm varies in a certain pattern. FIG. 9 illustrates time diagram indicating an example of the variation of the master cylinder hydraulic pressure with hysteresis Pmh when the master cylinder hydraulic pressure Pm varies in the certain pattern.

As indicated in FIG. 8, in this example, as hysteresis ranges of the master cylinder hydraulic pressure with hysteresis Pmh set corresponding to the master cylinder hydraulic pressure Pm, a static hysteresis area (an area indicated by undense dots) and a dynamic hysteresis areas A and B (areas indicated by dense dots) are set in advance.

Although the master cylinder hydraulic pressure Pm increases, a distance S of the hysteresis range of the master cylinder hydraulic pressure with hysteresis Pmh, corresponding to static hysteresis area (hereinbelow referred to as a static hysteresis range), is constant.

A lower limit of the static hysteresis range is equal to a value of the master cylinder hydraulic pressure Pm corresponding to the static hysteresis range. For example, when the master cylinder hydraulic pressure Pm is Pm1, the lower limit of the static hysteresis range becomes a value Pm1.

A hysteresis range of the master cylinder hydraulic pressure with hysteresis Pmh corresponding to the dynamic hysteresis area A (hereinafter referred to as a dynamic hysteresis range A) exists below the static hysteresis so as to continue from a lower limit of the static hysteresis range.

A hysteresis range of the master cylinder hydraulic pressure with hysteresis Pmh corresponding to the dynamic hysteresis area B (hereinafter referred to as a dynamic hysteresis range B) exists above the static hysteresis range so as to continue from an upper limit of the static hysteresis range. Each width of each dynamic hysteresis range A and B is set to a distance D, and although the master cylinder hydraulic pressure Pm increases, the distance D is constant.

In this embodiment, a value obtained by adding the dynamic hysteresis range A and the dynamic hysteresis range B to the static hysteresis range is defined as an entire hysteresis range of the master cylinder hydraulic pressure with hysteresis Pmh. The entire hysteresis range corresponds to an entire range and has an upper limit max and a lower limit min (an entire range upper limit and an entire range lower limit). For example, when the master cylinder hydraulic pressure Pm is Pm1, the entire hysteresis range of the master cylinder hydraulic pressure with hysteresis Pmh is indicated by an arrow in FIG. 8. A distance (D+S+D) of the entire hysteresis range of the master cylinder hydraulic pressure with hysteresis Pmh is constant not depending on the master cylinder hydraulic pressure Pm.

According to the device in the third embodiment, on the basis of following principles 1 through 4, the master cylinder hydraulic pressure with hysteresis Pmh is calculated and renewed in accordance with the variation of the master cylinder hydraulic pressure Pm.

(Principle 1)

When the previous value of the master cylinder hydraulic pressure with hysteresis Pmh exists within the static hysteresis range of the current value of the master cylinder hydraulic pressure Pm (hereinafter referred to as "a condition of being within a static hysteresis range"), the current value of the master cylinder hydraulic pressure with hysteresis Pmh is set to a value being equal to the previous value of the master cylinder hydraulic pressure with hysteresis Pmh.

(Principle 2)

When the previous value of the master cylinder hydraulic pressure with hysteresis Pmh exists within a dynamic hysteresis range A of the current value of the master cylinder hydraulic pressure Pm (hereinafter referred to as "a condition of being within a dynamic hysteresis range A"), the current value of the master cylinder hydraulic pressure with hysteresis Pmh is set to a value that is obtained by adding predetermined value Δp (small value) to the previous value of the master cylinder hydraulic pressure with hysteresis Pmh.

In this example, predetermined value Δp is D/N (N: an integral number being equal to or more than two, for example, N=30). In this configuration, during a period in which "the condition of being within the dynamic hysteresis range A" continues, the master cylinder hydraulic pressure with hysteresis Pmh becomes close to the lower limit of the static hysteresis range as time passes.

Then, once the previous value of the master cylinder hydraulic pressure with hysteresis Pmh reaches the lower limit of the static hysteresis range corresponding to the current value of the master cylinder hydraulic pressure Pm (the condition of being within the static hysteresis range), on the basis of Principle 1, current value of the master cylinder hydraulic pressure with hysteresis Pmh is sustained to a value that equals to a previous value of the master cylinder hydraulic pressure with hysteresis Pmh (lower limit of the static hysteresis range).

(Principle 3)

When the previous value of the master cylinder hydraulic pressure with hysteresis Pmh exists within the dynamic hysteresis range B corresponding to the current value of the master cylinder hydraulic pressure Pm (hereinafter referred to as "a condition of being within the dynamic hysteresis range B"), the current value of the master cylinder hydraulic pressure with hysteresis Pmh is set to a value that is obtained by subtracting the predetermined value Δp from the previous value of the master cylinder hydraulic pressure with hysteresis Pmh.

Thus, within the time period in which "the condition of being within the dynamic hysteresis range B" continues, the master cylinder hydraulic pressure with hysteresis Pmh gradually comes close to the upper limit of the static hysteresis range as time passes.

Then, once the previous value of the master cylinder hydraulic pressure with hysteresis Pmh reaches the upper limit of the static hysteresis range corresponding to the current value of the master cylinder hydraulic pressure Pm (the condition of being within the static hysteresis range), on the basis of Principle 1, the current value of the master cylinder hydraulic pressure with hysteresis Pmh is sustained to a value that is equal to the previous value of the master cylinder hydraulic pressure with hysteresis Pmh (the upper limit of the static hysteresis range).

(Principle 4)

When the previous value of the master cylinder hydraulic pressure with hysteresis Pmh exist out of the entire hysteresis range corresponding to the current value of the master cylinder hydraulic pressure Pm (hereinafter referred to as "a condition of being out of the entire hysteresis range"), the current value of the master cylinder hydraulic pressure with hysteresis Pmh is set to the upper limit max or the lower limit min of the entire hysteresis range corresponding to current value of the master cylinder hydraulic pressure Pm, the limit being closer to the previous value of the master cylinder hydraulic pressure with hysteresis Pmh.

A case in which the master cylinder hydraulic pressure Pm varies, forming a step shape in a pattern illustrated in FIG. 9 with a solid line is taken as an example, a calculation and a renewal of the master cylinder hydraulic pressure with hysteresis Pmh in this case will be explained in accordance with FIGS. 8 and 9. Before time t1, the master cylinder hydraulic pressure Pm and the master cylinder hydraulic pressure with hysteresis Pmh are sustained to zero.

At the time t1, the master cylinder hydraulic pressure Pm (current value) increases from zero to a value P8, forming a stepped shape. At this point, the lower limit min. of the entire hysteresis range corresponding to the current value of the master cylinder hydraulic pressure Pm (=P8) becomes P8'.

Specifically, the previous value of the master cylinder hydraulic pressure with hysteresis Pmh (=0) exists out of the entire hysteresis range corresponding to the current value of the master cylinder hydraulic pressure Pm (=P8) (in "the condition of being out of the entire hysteresis").

Accordingly, on the basis of Principle 4, the current value of the master cylinder hydraulic pressure with hysteresis Pmh is set to the lower limit min. (P8'), which is closer to the previous value of the master cylinder hydraulic pressure with hysteresis Pmh (zero). This condition corresponds to a point "a" in FIGS. 8 and 9.

During time period from the time t1 to time t3, the master cylinder hydraulic pressure Pm is sustained to the value P8. Thus, during this time period, the entire hysteresis range corresponding to the current value of the master cylinder hydraulic pressure Pm (=P8) is sustained to a certain range.

In other words, the upper limit of the dynamic hysteresis range A is sustained to the value P8, the lower limit of the static hysteresis range is set to the value P8, and the lower limit of the static hysteresis range is set to the value P8.

Specifically, after the time t1, the previous value of the master cylinder hydraulic pressure with hysteresis Pmh exists within the dynamic hysteresis range A corresponding to the current value of the master cylinder hydraulic pressure Pm (=P8) (the condition being within the dynamic hysteresis range A).

Thus, on the basis of Principle 2, after the time t1, the current value of the master cylinder hydraulic pressure with hysteresis Pmh is set so as to increases toward the lower limit (=P8) of the static hysteresis range as time passes.

At time t2, the master cylinder hydraulic pressure with hysteresis Pmh reaches the lower limit (=P8) of the static hysteresis range. This condition corresponds to a point "b" in FIGS. 8 and 9. After the time t2, the previous value of the master cylinder hydraulic pressure with hysteresis Pmh (=P8) exists within the static hysteresis range corresponding to the current value of the master cylinder hydraulic pressure Pm (=P8) (the condition of being within the static hysteresis range).

Thus, on the basis of Principle 1, after time t2, the current value of the master cylinder hydraulic pressure with hysteresis Pmh is set to a value that equals to the previous value of the master cylinder hydraulic pressure with hysteresis Pmh (=P8). In other words, during the time period between the time t2 and the time t3, the current value of the master cylinder hydraulic pressure with hysteresis Pmh is sustained to the value P8.

At the time t3, the master cylinder hydraulic pressure Pm (current value) starts decreasing from the value P8 to the value P3, forming a stepped shape. Accordingly, the upper limit max of the entire hysteresis range corresponding to the current value of the master cylinder hydraulic pressure Pm (=P3) becomes P5'. In other words, the previous value of the master cylinder hydraulic pressure with hysteresis Pmh (=P8) exists out of the entire hysteresis range corresponding to the current value of the master cylinder hydraulic pressure Pm (=P3) (the condition of being out of the entire hysteresis range).

Thus, on the basis of Principle 4, the current value of the master cylinder hydraulic pressure with hysteresis Pmh is set to the upper limit max (=P5') of the entire hysteresis range corresponding to the current value of the master cylinder hydraulic pressure Pm (=P3). This condition corresponds to a point "c" in FIGS. 8 and 9.

During time period from the time t3 to the time t5, the master cylinder hydraulic pressure Pm is sustained to a value P3. Accordingly, during this time period, the upper limits of the dynamic hysteresis range B is sustained to the value P5', the lower limit of the dynamic hysteresis range B is sustained to the value P5, and the upper limit of the static hysteresis range is set to the value P5.

In other words, after the time t3, the previous value of the master cylinder hydraulic pressure with hysteresis Pmh exists within the dynamic hysteresis range B corresponding to the current value of the master cylinder hydraulic pressure Pm (=P3) (the condition of being within the dynamic hysteresis range B). Thus, on the basis of Principle 3, after the time t3, the current value of the master cylinder hydraulic pressure with hysteresis Pmh reduces so as to come close to the upper limit (=P5) of the static hysteresis range as time passes.

At the time t4, the master cylinder hydraulic pressure with hysteresis Pmh reaches the upper limit of the static hysteresis range (=P5). This condition corresponds to the point "d" in FIGS. 8 and 9. Accordingly, after the time t4, the previous value of the master cylinder hydraulic pressure with hysteresis Pmh (=P5) exists within the static hysteresis range corresponding to the current value of the master cylinder hydraulic pressure Pm (=P3) (the condition within the static hysteresis range). Thus, on the basis of Principle 1, after the time t4, the current value of the master cylinder hydraulic pressure with hysteresis Pmh is set to a value that equals to the previous value of the master cylinder hydraulic pressure with hysteresis Pmh (=P5). In other words, during time period from the time t4 to the time t5, the current value of the master cylinder hydraulic pressure with hysteresis Pmh is sustained to the value P5.

At the time t5, the master cylinder hydraulic pressure Pm (current value) increases from the value P3 to the value P4, forming a stepped shape, however, the previous value of the master cylinder hydraulic pressure with hysteresis Pmh (=P5) exists within the static hysteresis range corresponding to the current value of the master cylinder hydraulic pressure Pm (=P4) (the condition of being within the static hysteresis range).

Accordingly, on the basis of Principle 1, at the time t5, the current value of the master cylinder hydraulic pressure with hysteresis Pmh is set to the previous value of the master cylinder hydraulic pressure with hysteresis Pmh (=P5). This condition corresponds to a point "e" in FIGS. 8 and 9.

During time period from the time t5 to the time t6, the master cylinder hydraulic pressure Pm is sustained to the value P4. Thus, in this time period, the previous value of the master cylinder hydraulic pressure with hysteresis Pmh (=P5) exists within the static hysteresis range corresponding to the current value of the master cylinder hydraulic pressure Pm (=P4) (the condition of being within the static hysteresis range). Thus, on the basis of Principle 1, during the time period from the time t5 to the time t6, the current value of the master cylinder hydraulic pressure with hysteresis Pmh is sustained to the previous value of the master cylinder hydraulic pressure with hysteresis Pmh (=P5).

At the time t6, the master cylinder hydraulic pressure Pm (current value) starts increasing from the value P4 to the value P7 with forming the step shape. Accordingly, the lower limit min of the entire hysteresis range corresponding to the current value of the master cylinder hydraulic pressure Pm (=P7) becomes P7'. Specifically, the previous value of the master cylinder hydraulic pressure with hysteresis Pmh (=P5) exists out of the entire hysteresis range corresponding to the current value of the master cylinder hydraulic pressure Pm (=P7) (the condition for being out of the entire hysteresis range). Thus, on the basis of Principle 4, the current value of the master cylinder hydraulic pressure with hysteresis Pmh is set to the lower limit min. (=P7') corresponding to the current value of the master cylinder hydraulic pressure Pm (=P7). This condition corresponds to a point "f" in FIGS. 8 and 9.

During time period from the time t6 to the time t8, the master cylinder hydraulic pressure Pm is sustained to the value P7. Accordingly, the upper limit of the dynamic hysteresis range A is set to the value P7, the lower limit of the dynamic hysteresis range A is set to the value P7', and the lower limit of the static hysteresis range is sustained to the value P7. Specifically, after the time t6, the previous value of the master cylinder hydraulic pressure with hysteresis Pmh exists within the dynamic hysteresis range A corresponding to the current value of the master cylinder hydraulic pressure Pm (=P7) (the condition of being within the dynamic hysteresis range A). Thus, on the basis of Principle 2, after the time t6, the current value of the master cylinder hydraulic pressure with hysteresis Pmh increases so as to come close to the lower limit (=P7) of the static hysteresis range as time passes.

At the time t7, the master cylinder hydraulic pressure with hysteresis Pmh reaches the lower limit (=P7) of the static hysteresis range. This condition corresponds to a point "g" in FIGS. 8 and 9. Accordingly, after the time t7, the previous value of the master cylinder hydraulic pressure with hysteresis Pmh (=P7) exists within the static hysteresis range of the current value of the master cylinder hydraulic pressure Pm (=P7) (the condition for being within the static hysteresis range). Thus, on the basis of Principle 1, after the time t7, the current value of the master cylinder hydraulic pressure with hysteresis Pmh is set to a value that equals to the previous value of the master cylinder hydraulic pressure with hysteresis Pmh (=P7). In other words, during the time period from the time t7 to the time t8, the current value of the master cylinder hydraulic pressure with hysteresis Pmh is sustained to the value P7.

At the time t8, the current value of the master cylinder hydraulic pressure Pm starts decreasing from the value P7 to a value P6, forming a stepped shape. However, the previous value of the master cylinder hydraulic pressure with hysteresis Pmh (=P7) exists within the static hysteresis range corresponding to the current value of the master cylinder hydraulic pressure Pm (=P6) (the condition of being within the static hysteresis range). Accordingly, on the basis of Principle 1, at the time t8, the current value of the master cylinder hydraulic pressure with hysteresis Pmh is sustained to the previous value of the master cylinder hydraulic pressure with hysteresis Pmh (=P7). This condition corresponds to a point "h" in FIGS. 8 and 9.

During time period from the time t8 to time t9, the master cylinder hydraulic pressure Pm is sustained to the value P6. Accordingly, during this time period, the previous value of the master cylinder hydraulic pressure with hysteresis Pmh (=P7) exists within the static hysteresis range corresponding to the current value of the master cylinder hydraulic pressure Pm (=P6) (the condition of being within the static hysteresis range). Thus, on the basis of Principle 1, during the time period from the time t8 to the time t9, the current value of the master cylinder hydraulic pressure with hysteresis Pmh is sustained to the previous value of the master cylinder hydraulic pressure with hysteresis Pmh (=P7).

At the time t9, the master cylinder hydraulic pressure Pm (current value) starts decreasing from the value P6 to the value P1, forming a stepped shape. Accordingly, the upper limit max. of the entire hysteresis range corresponding to the current value of the master cylinder hydraulic pressure Pm (=P1) becomes P2'. Specifically, the previous value of the master cylinder hydraulic pressure with hysteresis Pmh (=P7) exists out of the entire hysteresis range corresponding to the current value of the master cylinder hydraulic pressure Pm (=P1) (the condition of being out of the entire hysteresis range). Thus, on the basis of Principle 4, the current value of the master cylinder hydraulic pressure with hysteresis Pmh is set to the upper limit max (=P2') of the entire hysteresis range corresponding to the current value of the master cylinder hydraulic pressure Pm. This condition corresponds to a point "i" in FIGS. 8 and 9.

After the time t9, the master cylinder hydraulic pressure Pm is sustained to the value P1. Accordingly, during this time period, the upper limit of the dynamic hysteresis range B is set to the value P2', the lower limit of the dynamic hysteresis range B is set to the value P2, and the upper limit of the static hysteresis range is set to the value P2. Specifically, after the time t9, the previous value of the master cylinder hydraulic pressure with hysteresis Pmh exists within the dynamic hysteresis range B corresponding to the current value of the master cylinder hydraulic pressure Pm (=P1) (the condition of being within the dynamic hysteresis range B). Thus, on the basis of Principle 3, after the time t9, the current value of the master cylinder hydraulic pressure with hysteresis Pmh reduces so as to come close to the upper limit (=P2) of the static hysteresis range as time passes.

Then, at time t10, the master cylinder hydraulic pressure with hysteresis Pmh reaches the upper limit (=P2) of the static hysteresis range. This condition corresponds to a point "j" in FIGS. 8 and 9. Thus, after the time t10, the previous value of the master cylinder hydraulic pressure with hysteresis Pmh (=P2) exists within the static hysteresis range corresponding to the current value of the master cylinder hydraulic pressure Pm (=P1) (the condition of being within the static hysteresis range). Thus, on the basis of Principle 1, after the time t10, the current value of the master cylinder hydraulic pressure with hysteresis Pmh is sustained to the value P2.

Thus, according to the control unit of the brake apparatus for the vehicle in the third embodiment, the master cylinder hydraulic pressure with hysteresis Pmh is calculated and renewed as mentioned above. For example, when the distance S of the static hysteresis range is set to a value that is larger than the hunting range W (see FIG. 7) of the master cylinder hydraulic pressure Pm of the master cylinder hydraulic pressure hunting (W<S), when the master cylinder hydraulic pressure Pm varies, only "the condition of being within the static hysteresis range" continues. As a result, the master cylinder hydraulic pressure with hysteresis Pmh does not vary.

Also, when the distance S of the static hysteresis range is set to a value that is smaller than the hunting range W of the master cylinder hydraulic pressure Pm at the same time, a value obtained by adding the distance D of the dynamic hysteresis range to the distance S of the static hysteresis range (S+D) is set to be larger than the hunting range W of the master cylinder hydraulic pressure Pm (S<W<(S+D)), while the master cylinder hydraulic pressure Pm varies, in a short time period in a single cycle of the variation of the master cylinder hydraulic pressure Pm, the "condition of being within the dynamic hysteresis range" continues, and in the rest of the time period in the single cycle of the variation of the master cylinder hydraulic pressure Pm, the "condition of being within the static hysteresis range" continues.

As a result, although the master cylinder hydraulic pressure with hysteresis Pmh varies to some extent only in the short time period in which the condition of being within the dynamic hysteresis range continues, it can be considered that the master cylinder hydraulic pressure with hysteresis Pmh has practically not varied.

According to the control unit of the brake apparatus for the vehicle in the embodiment, the distance S of the static hysteresis range and the distance D of each dynamic hysteresis range A and B are set so as to fulfill the relation of "S<W<(S+D)". Thus, using the master cylinder hydraulic pressure with hysteresis Pmh calculated and renewed on the basis of these hysteresis ranges, the target wheel cylinder hydraulic pressure Pwt is set so as to be in proportion to the master cylinder hydraulic pressure with hysteresis Pmh.

Figure 7A:
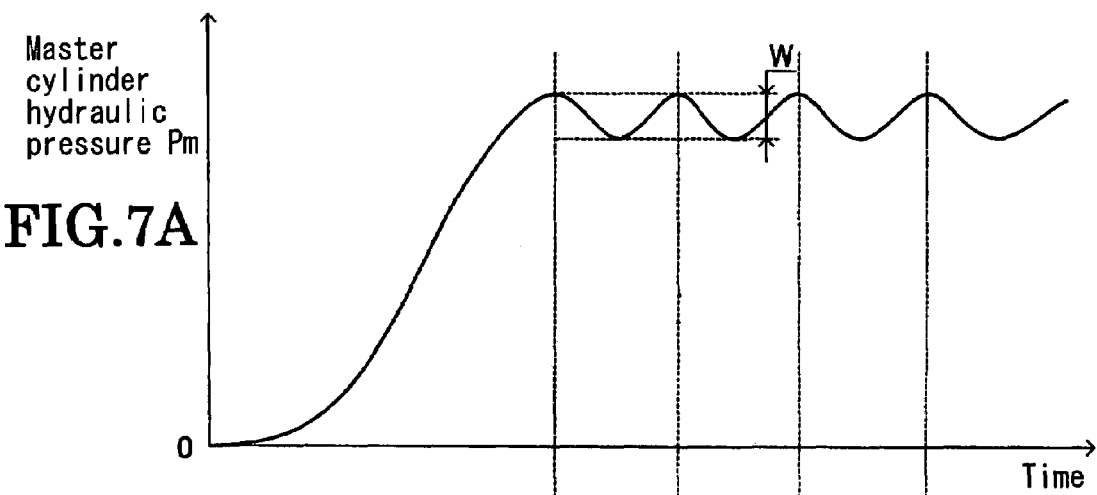
FIGS. 7A, 7B and 7C each illustrates variation of the master cylinder hydraulic pressure, the target wheel cylinder hydraulic pressure, and the command current when master cylinder hydraulic pressure hunting occurs.
Figure 7B:
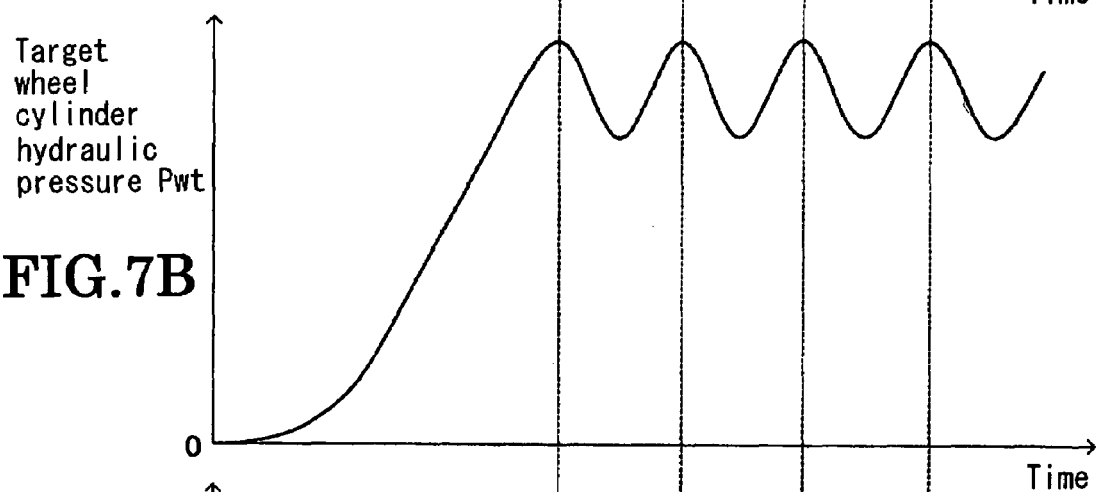
Figure 7C:
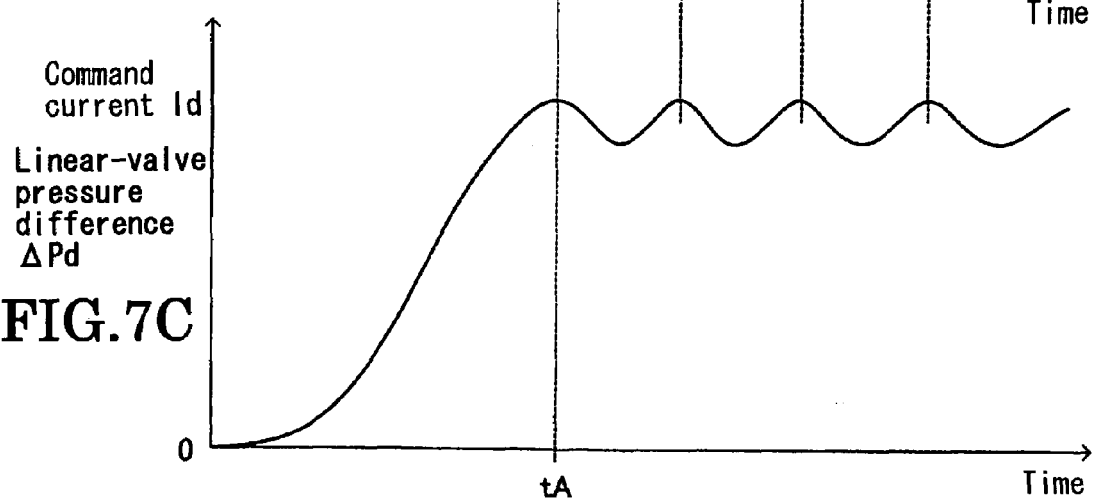
Figure 10A:
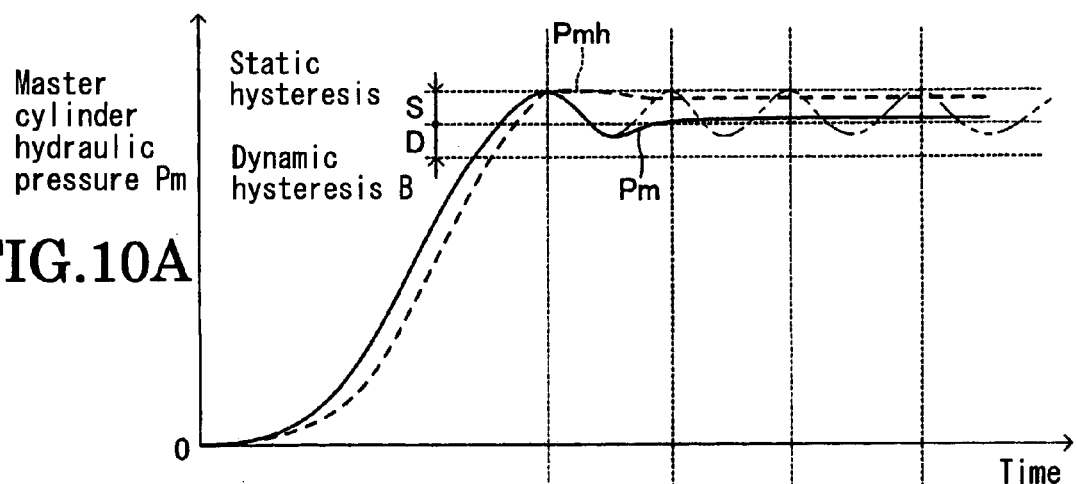
FIGS. 10A, 10B and 10C each illustrates a time diagram in which the master cylinder hydraulic pressure hunting is reduced.
Figure 10B:
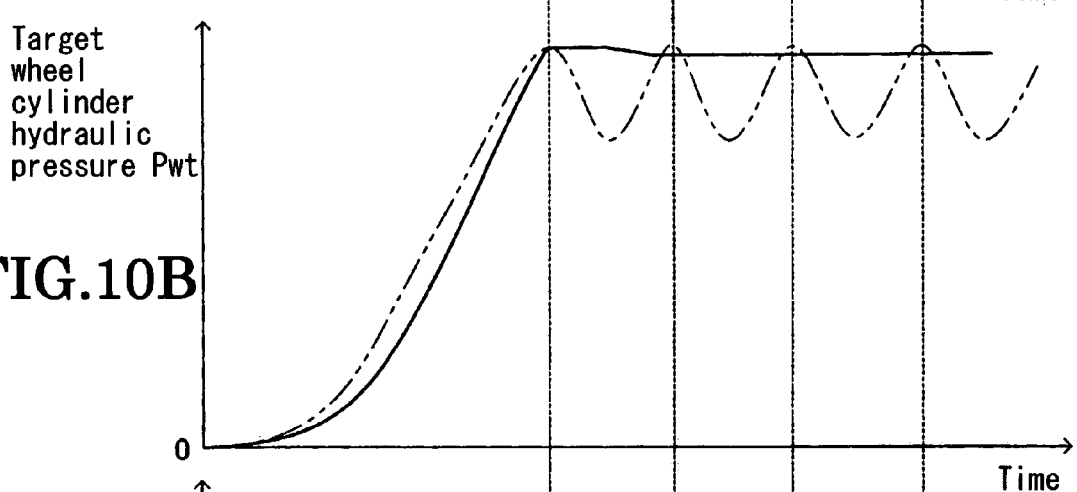
Figure 10C:
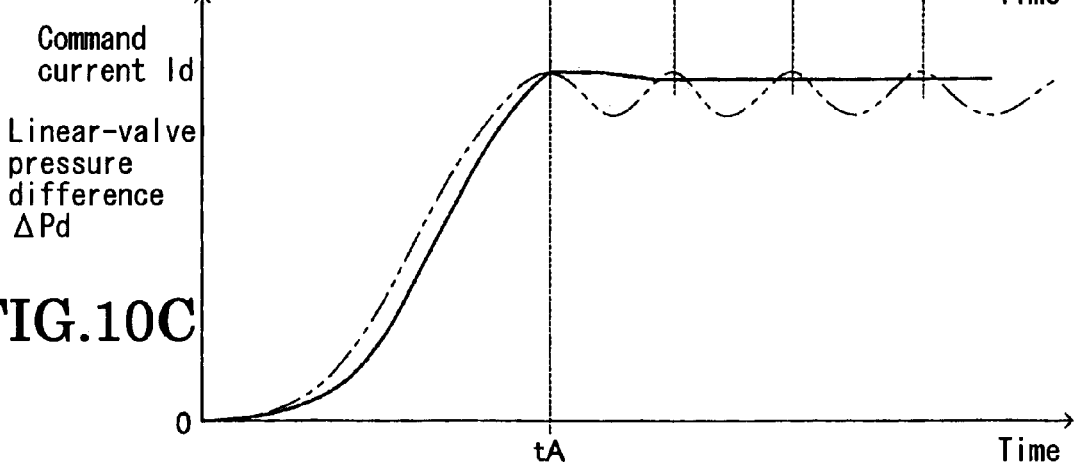

FIG. 10 illustrates time diagrams indicating a variation of each values corresponding to the drawings in FIG. 7 when the target wheel cylinder hydraulic pressure Pwt is determined by use of the master cylinder hydraulic pressure with hysteresis Pmh calculated and renewed as mentioned above. The chain double-dashed line in each of the FIGS. 10A, 10B and 10C corresponds to the solid line in each of the FIGS. 7A, 7B and 7C.

As illustrated in FIG. 10A, before time tA, as the master cylinder hydraulic pressure Pm (see the solid line) increases, "the condition of being out of the entire hysteresis range" or "the condition of being within the dynamic hysteresis range (dynamic hysteresis range A)" continues, and, because the master cylinder hydraulic pressure is set on the basis of Principles 2 and 4, the master cylinder hydraulic pressure with hysteresis Pmh (see the dashed line) increases while being below the level of the master cylinder hydraulic pressure Pm in a manner where a difference (Pm−Pmh) does not exceed the distance D of the dynamic hysteresis range (dynamic hysteresis range A).

Then, from immediately before the time tA at which the increase of the master cylinder hydraulic pressure Pm ends, an increasing slope of the master cylinder hydraulic pressure Pm reduces, and because of this reduction of the increasing slope, only the "condition of being within the dynamic hysteresis range" continues. As a result, at the time tA, the master cylinder hydraulic pressure with hysteresis Pmh reaches the master cylinder hydraulic pressure Pm.

Because the master cylinder hydraulic pressure with hysteresis Pmh increases in this manner, before the time tA, the target wheel cylinder hydraulic pressure Pwt determined so as to be in proportion to the master cylinder hydraulic pressure with hysteresis Pmh increases as indicated with a solid line in FIG. 10B, and the linear-valve pressure difference ΔPd increases as indicated with the solid lines in FIG. 10C.

After the time tA, the master cylinder hydraulic pressure Pm starts reducing, however, at a point shortly after the time tA, only the "condition of being within the static hysteresis range" continues. Thus, as indicated with a dashed line in FIG. 10A, after the time tA, the master cylinder hydraulic pressure with hysteresis Pmh is sustained to a certain level. Then, after a point at which the difference (Pmh−Pm) exceeds the distance S of the static hysteresis range, the "condition of being within the length D of the dynamic hysteresis range B" continues, and in accordance with the excess of the difference (Pmh−Pm) relative to the distance S of the static hysteresis range, the master cylinder hydraulic pressure with hysteresis Pmh is slightly reduced.

On the other hand, after the time tA, because the master cylinder hydraulic pressure with hysteresis Pmh has practically not varied, both the target wheel cylinder hydraulic pressure Pwt and the linear-valve pressure difference ΔPd do not practically vary. Specifically, "tendency that the inlet velocity exceeds the exit velocity" caused by the decrease of the linear-valve pressure difference ΔPd does not practically occur. Thus, as indicated with the solid line in FIG. 10A, the master cylinder hydraulic pressure Pm is temporally decreased after the time tA, and then it gradually increases.

While the master cylinder hydraulic pressure Pm gradually increases, only the "condition of being within the static hysteresis range" continues. Thus, as indicated by the dashed line in FIG. 10A, the master cylinder hydraulic pressure with hysteresis Pmh is sustained to a certain level. Thus, the target wheel cylinder hydraulic pressure Pwt and the linear-valve pressure difference ΔPd have been sustained to certain levels as indicated by solid lines in FIGS. 10B and 8C.

Then, as indicated by the solid line in FIG. 10A, the master cylinder hydraulic pressure Pm converges to a certain value that is smaller than the master cylinder hydraulic pressure with hysteresis Pmh within a range in which the difference (Pmh−Pm) does not exceed the distance S of the static hysteresis range.

Thus, according to the control unit of the brake apparatus for the vehicle of the third embodiment, even when the master cylinder hydraulic pressure Pm varies due to the in-line system, this variation does not continue. Specifically, the generation of the master cylinder hydraulic pressure hunting is reduced. In the above-mentioned manner, the master cylinder hydraulic pressure hunting can be reduced.

(Reduction of Steady-State Deviation)

Figure 11:
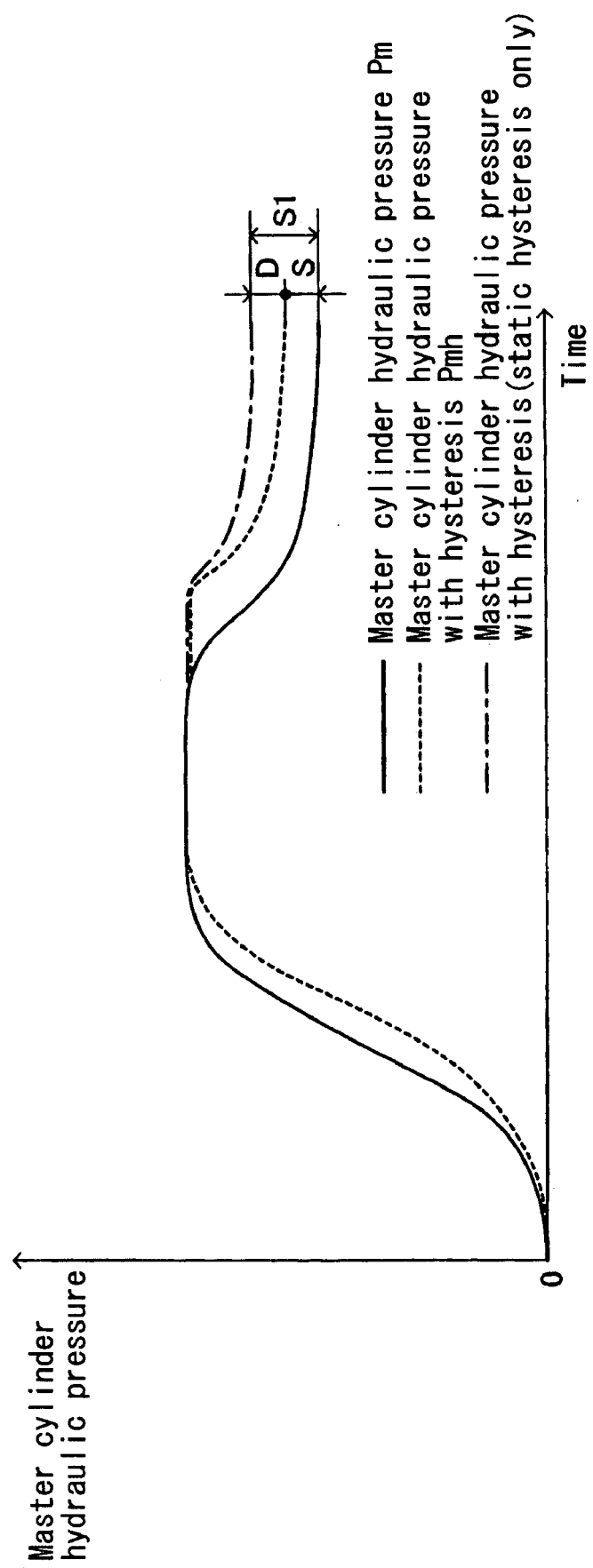
FIG. 11 illustrates a diagram explaining that steady-state deviations of the master cylinder hydraulic pressure and the master cylinder hydraulic pressure with hysteresis are reduced using the static hysteresis range together with the dynamic hysteresis range.

FIG. 11 illustrates a graph indicating a variation of the master cylinder hydraulic pressure Pm (see the solid line) and a variation of the master cylinder hydraulic pressure with hysteresis Pmh (see the dashed line), which is calculated by the control unit of the brake apparatus for the vehicle, when the master cylinder hydraulic pressure Pm is increased, sustained to a certain level, reduced, and then is sustained to a certain level.

As the master cylinder hydraulic pressure Pm increases, because the "condition of being within the dynamic hysteresis range (dynamic hysteresis A)" or the "condition of being out of the entire hysteresis range" continues, and because the master cylinder hydraulic pressure is set on the basis of Principles 2 and 4, the master cylinder hydraulic pressure with hysteresis Pmh increases with keeping its level below the master cylinder hydraulic pressure Pm within a range in which the difference (Pm−Pmh) does not exceed the distance D of the dynamic hysteresis range (dynamic hysteresis range A). From a point immediately before a point at which the increasing master cylinder hydraulic pressure Pm is sustained to a certain level, because an increasing slope of the master cylinder hydraulic pressure Pm decreases, the "condition of being within the dynamic hysteresis range A" continues, as a result, the master cylinder hydraulic pressure with hysteresis Pmh reaches the master cylinder hydraulic pressure Pm to the point where the master cylinder hydraulic pressure Pm starts being sustained to the certain level. Then, while the master cylinder hydraulic pressure Pm is sustained to the certain level, the "condition of being within the static hysteresis range" continues, and the master cylinder hydraulic pressure with hysteresis Pmh has been sustained to a value that equals the master cylinder hydraulic pressure Pm. These acts correspond to the times t1 through t3, and the times t6 through t8 in FIG. 9.

Thus, when the increasing master cylinder hydraulic pressure Pm is sustained to a certain level, a stationary deviation (steady-state deviation) between the master cylinder hydraulic pressure with hysteresis Pmh and the master cylinder hydraulic pressure Pm becomes zero. Thus, the target wheel cylinder hydraulic pressure Pwt (an actual value of the wheel cylinder hydraulic pressure) determined on the basis of the master cylinder hydraulic pressure with hysteresis Pmh agrees with a value requested by a driver's braking operation, as a result, the driver may not feel poor brake pedal feeling. It can be prevented that the braking force that meets the driver's intention is not generated due to the target wheel cylinder hydraulic pressure Pwt (the actual value of the wheel cylinder hydraulic pressure) being smaller than the value required by the driver's braking operation, because, as mentioned above, the lower limit of the static hysteresis range is set to a value that equals to the master cylinder hydraulic pressure Pm corresponding to the static hysteresis range.

As the master cylinder hydraulic pressure Pm reduces, because the "condition of being out of the entire hysteresis range" or the "condition of being within the dynamic hysteresis range B" continues, the master cylinder hydraulic pressure with hysteresis Pmh reduces with keeping its value above the master cylinder hydraulic pressure Pm within a range in which the difference (Pmh−Pm) does not exceed a value obtained by adding the distance S of the static hysteresis range to the dynamic hysteresis range D (S+D). Then, from immediately before the point at which the decreased master cylinder hydraulic pressure Pm starts being sustained to a certain level, because the decreasing slope of the master cylinder hydraulic pressure Pm is reduced, only the "condition of being within the dynamic hysteresis range B" continues. As a result, near the point at which the decreased master cylinder hydraulic pressure Pm starts being sustained to the certain level, the master cylinder hydraulic pressure with hysteresis Pmh agrees with a value obtained by adding the distance S of the static hysteresis range to the master cylinder hydraulic pressure Pm (Pm+S). Then, because the "condition of being within the static hysteresis range" continues while the master cylinder hydraulic pressure Pm is sustained to a certain level, the master cylinder hydraulic pressure with hysteresis Pmh has been sustained to the value (Pm+S). These acts corresponds to the times t3 through 5, and the times t9 through t10 in FIG. 9.

As mentioned above, after the master cylinder hydraulic pressure Pm is decreased, and then it is sustained to a certain level, a steady-state deviation between the master cylinder hydraulic pressure with hysteresis Pmh and the master cylinder hydraulic pressure Pm becomes the distance S of the static hysteresis range. The larger the steady state deviation is, the larger the lack of the decrease of the actual value of the wheel cylinder hydraulic pressure relative to the decreasing of the wheel cylinder hydraulic pressure requested by the driver becomes, as a result, the driver may further feel residual of the wheel cylinder hydraulic pressure (residual pressure feeling) during the process in which the brake pedal is restored. Thus, it is preferred to set the steady-state deviation, in other words the distance S of the static hysteresis, to a small value.

As mentioned above, according to the control unit of the brake apparatus for the vehicle, the distance S of the static hysteresis range and each of the distances D of the dynamic hysteresis ranges A and B are set so as to fulfill the relational formula "S<W<(S+D)". Specifically, the master cylinder hydraulic pressure hunting is reduced by use of a combination of the static hysteresis range and the dynamic hysteresis range.

Figure 12:
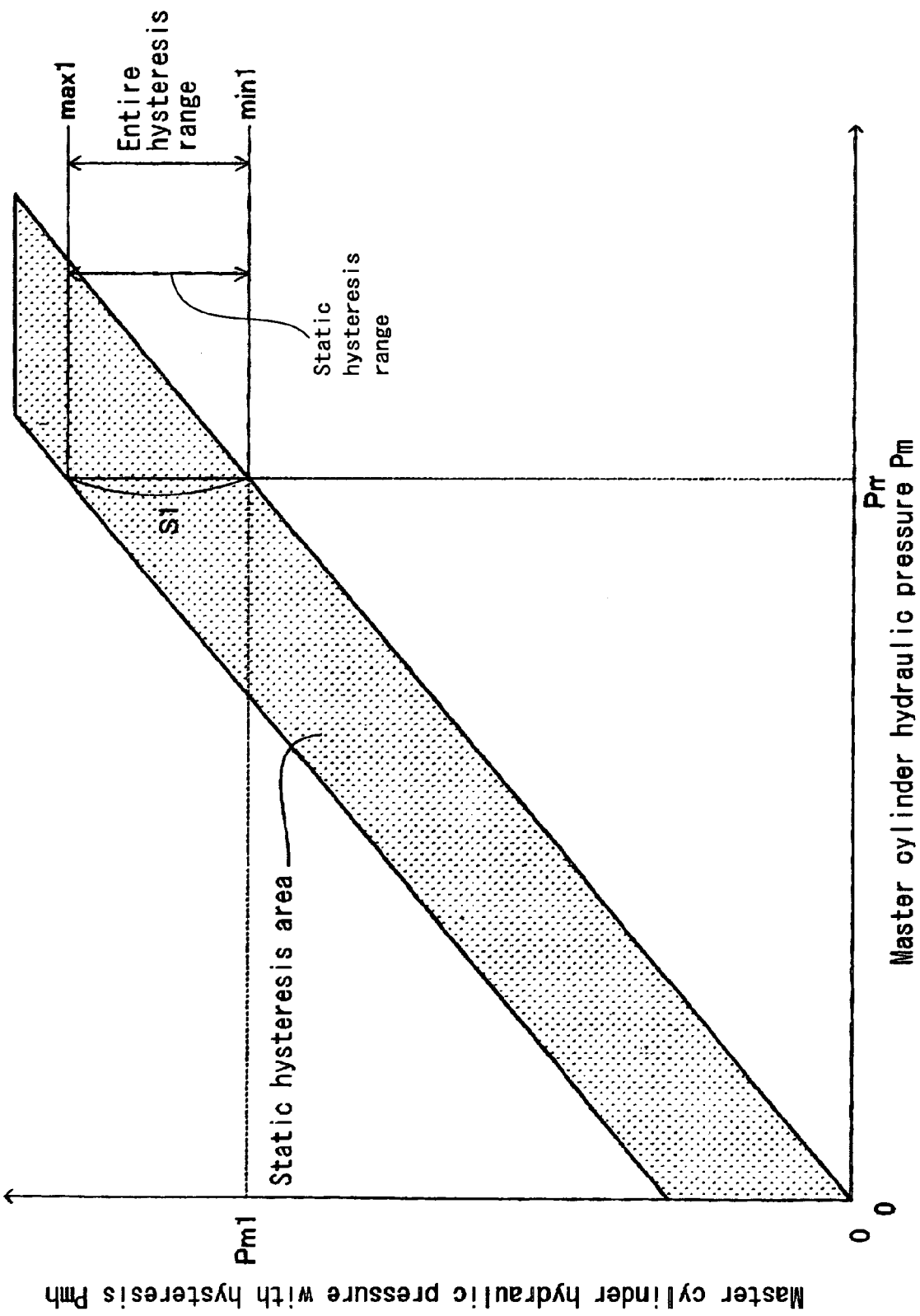
FIG. 12 illustrates a graph indicting a relation the master cylinder hydraulic pressure and the static hysteresis range of the master cylinder hydraulic pressure with hysteresis when only the static hysteresis range is used.

On the other hand, when the master cylinder hydraulic pressure hunting is reduced only by use of the static hysteresis range, not using the dynamic hysteresis range, as mentioned above, the distance S of the static hysteresis range needs to be set at a value that is larger than the hunting range W of the master cylinder hydraulic pressure Pm. In this case, as indicated in FIG. 12, the static hysteresis range is set to a range that is obtained by adding the dynamic hysteresis range B of the control unit of the brake apparatus for the vehicle in the embodiment to the static hysteresis range of the control unit of the brake apparatus for the vehicle. A distance S1 of the static hysteresis range in this case is "S+D".

In a case in which only the static hysteresis range is set as indicated in FIG. 12, when the decreased master cylinder hydraulic pressure Pm is sustained to a certain level, as indicated with a dashed line in FIG. 11, a steady-state deviation between the master cylinder hydraulic pressure with hysteresis and the master cylinder hydraulic pressure Pm becomes the distance S1 of the static hysteresis range, and this value is larger than the steady-state deviation (=S) obtained by the control unit of the brake apparatus for the vehicle in the third embodiment.

Thus, according to the control unit of the brake apparatus for the vehicle in the third embodiment, by use of the combination of the static hysteresis range and the dynamic hysteresis range, the master cylinder hydraulic pressure hunting can firmly be reduced, at the same time, comparing to the case where only the static hysteresis range is set, the driver feels the residual pressure during the process in which the brake pedal is reduced less.

(Actual Operation)

An actual operation of the braking apparatus 10 of the embodiment related to the present invention will be explained below in accordance with flow charts illustrated in FIGS. 13 and 14 indicating a routine (program) executed by a CPU 51.

Figure 13:
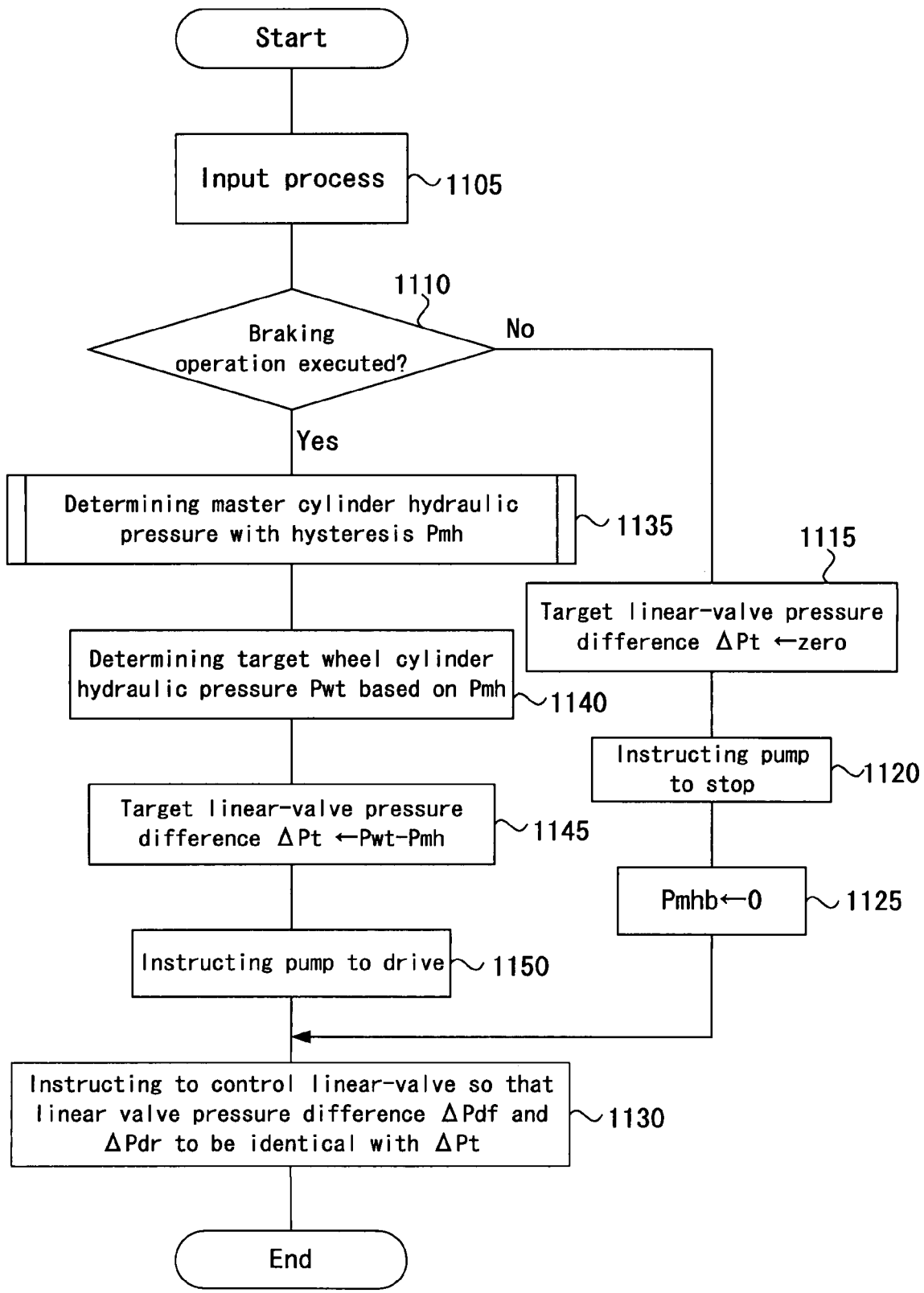
FIG. 13 illustrates a flow chart indicating a routine executed by a CPU.

The CPU 51 repeatedly executes the routine indicated in FIG. 13 in a predetermined time cycle (e.g., 6 msec). When a predetermined timing has come, the CPU 51 starts a process of the routine and goes to Step 1105. In Step 1105, the CPU 51 inputs output values (output signals) from the sensors 41, 42 and 43.

Then, the CPU 51 goes to Step 1110. In Step 1110, it is determined whether or not the braking operation is executed. In this example, when a brake switch 42 outputs an ON signal, it is determined that the braking operation is executed, and when the brake switch 42 outputs an OFF signal, it is determined that the braking operation is not executed.

When the vehicle is running and the braking operation is not operated, in Step 1110, the CPU 51 determines "NO" and goes to Step 1115. In Step 1115, the target linear-valve pressure difference ΔPt is set to zero, and the process goes to Step 1120. In Step 1120, the CPU 51 commands the motor MT (drive circuit of the motor MT) to stop the pumps HP1 and HP2, and the process goes to Step 1125. In Step 1125, as a preparation for the calculation of the master cylinder hydraulic pressure with hysteresis Pmh, the previous value Pmhb of the master cylinder hydraulic pressure with hysteresis Pmh is set to an initial value "zero".

Then, the process goes to Step 1130. In Step 1130, the CPU 51 controls the command current Id supplied to the pressure difference control valves 16 and 36 so that the linear-valve pressure difference ΔPd (=ΔPdf=ΔPdr) reaches the target linear-valve pressure difference ΔPt (at this point, ΔPt="0").

As the pumps HP1 and HP2 are stopped, the linear-valve pressure difference ΔPd becomes zero. At this point, because the braking operation has not been executed, the master cylinder hydraulic pressure Pm is also zero. Thus, in this case, the wheel cylinder hydraulic pressure Pw (=Pm+ΔPd) becomes zero, and a hydraulic braking force is not generated. This process is repeated as long as the CPU 51** determines that the braking operation is not executed.

Then, an operation executed when the driver starts operating the brake pedal in the abovementioned situation (while the vehicle is running) will be explained. In this situation, the brake switch 42 outputs ON signal. Thus, the CPU 51 in Step 1110 determines "YES" and goes to Step 1135.

Figure 14:
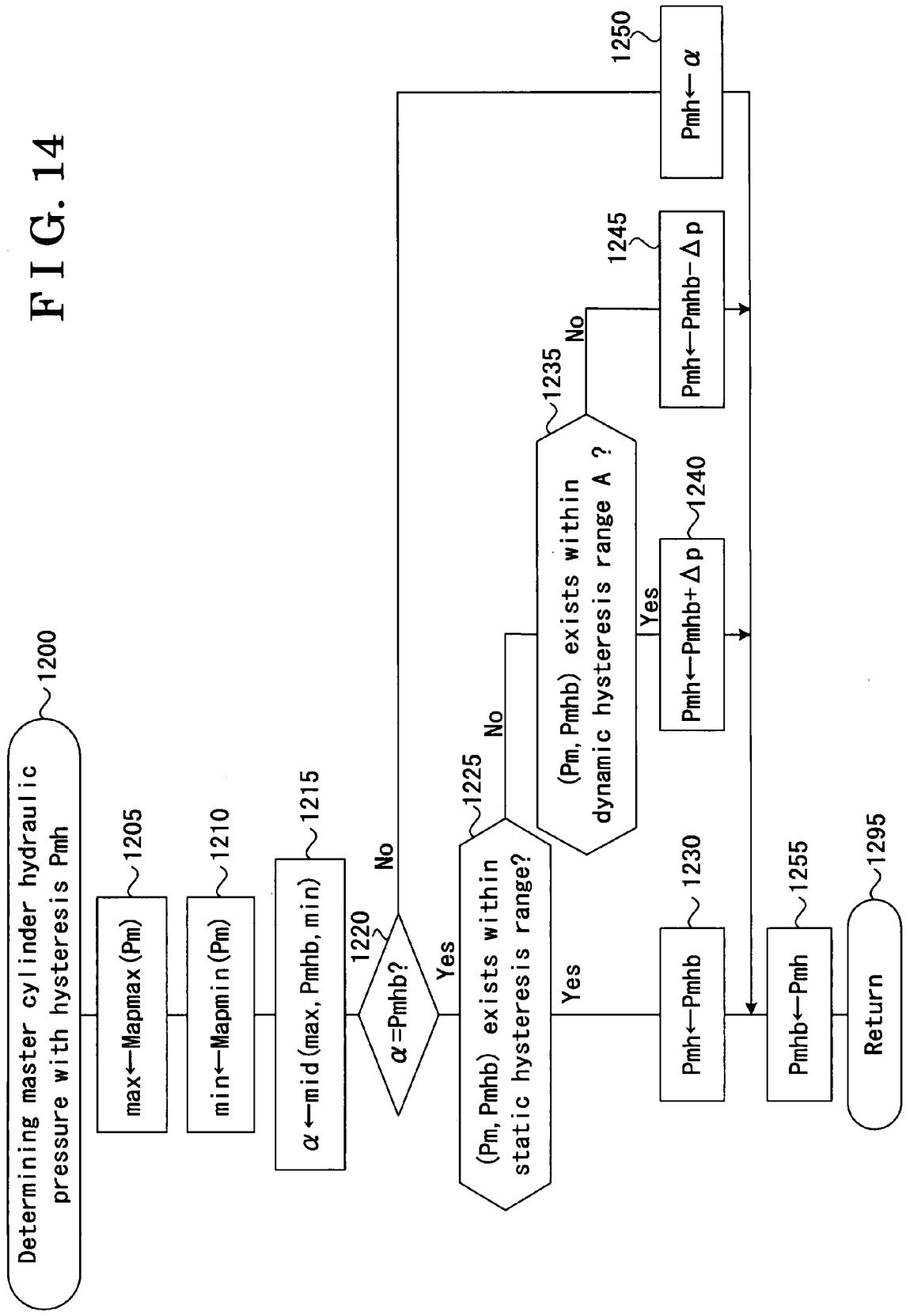
FIG. 14 illustrates a flow chart indicating a routine for determining the master cylinder hydraulic pressure with hysteresis executed by the CPU.

In Step 1135, the CPU 51 further goes to Step 1200 indicated in FIG. 14 and executes a routine for determining the master cylinder hydraulic pressure with hysteresis Pmh. Specifically, once the process goes to from Step 1200 to Step 1205, the CPU 51 determines an upper limit max on the basis of the current master cylinder hydraulic pressure Pm and a table memorized in the ROM 52 in advance. The table in the ROM 52 defines a relation between the master cylinder hydraulic pressure Pm and the upper limit max of the entire hysteresis range (see FIG. 8). As the master cylinder hydraulic pressure Pm becomes large, the upper limit max is set to a large value.

Then, the process goes to Step 1210. In Step 1210, the CPU 51 determines a lower limit min. on the basis of the current master cylinder hydraulic pressure Pm and a table memorized in the ROM 52 in advance. The table in the ROM 52 defines a relation between the master cylinder hydraulic pressure Pm and the lower limit min. of the entire hysteresis range (see FIG. 8). As the master cylinder hydraulic pressure Pm becomes large, the lower limit min. sets to a large value.

Then the process goes to Step 1215. In Step 1215, the CPU 51 sets a value α to a middle value among the upper limit max., the previous value of the master cylinder hydraulic pressure with hysteresis Pmhb and the lower limit min. As the previous value of the master cylinder hydraulic pressure with hysteresis Pmhb, the value that has been renewed in the previous cycle of this routine in Step 1255, which will be described later, is used. Only when the Step 1215 is executed for the first time since the braking operation is started, the previous value of the master cylinder hydraulic pressure with hysteresis Pmhb is set to zero on the basis of the process in Step 1125.

The process goes to Step 1220. In Step 1220, it is determined whether or not the value α equals to the previous value of the master cylinder hydraulic pressure with hysteresis Pmhb. When it is determined that the value α equals to the previous value of the master cylinder hydraulic pressure with hysteresis Pmhb, the value corresponds to the "condition of being within the static hysteresis range" or the "condition of being within the dynamic hysteresis ranges A and B". When it is determined that the value α does not equal to the previous value of the master cylinder hydraulic pressure with hysteresis Pmhb, the value corresponds to the "condition of being out of the entire hysteresis range".

When it is determined "Yes" in Step 1220, the process goes to Step 1225. In Step 1225, it is determined whether or not the points (Pm, Pmhb) exists within the static hysteresis area (whether or not it is the "condition of being within the static hysteresis range). When it is determined "Yes" in Step 1225 (when the points (Pm, Pmhb) exists within the static hysteresis range), the process goes to Step 1230. In Step 1230, on the basis of Principle 1, the master cylinder hydraulic pressure with hysteresis Pmh (current value) is set to a value that equals to the previous value of the master cylinder hydraulic pressure with hysteresis Pmhb.

On the other hand, when it is determined "No" in Step 1225, the process goes to Step 1235. In Step 1235, it is determined whether or not the points (Pm, Pmhb) exists within the dynamic hysteresis area A (whether or not it is the condition of being within the dynamic hysteresis range A). When it is determined "Yes" in Step 1235 (the condition of being within the dynamic hysteresis range A), the process goes to Step 1240. In Step 1240, on the basis of Principle 2, the master cylinder hydraulic pressure with hysteresis Pmh (current value) is set to a value that is obtained by adding the predetermined value Δp to the previous value of the master cylinder hydraulic pressure with hysteresis Pmhb (Pmhb+Δp).

When it is determined "No" in Step 1235 (it is the condition of being within the dynamic hysteresis range B), the process goes to Step 1245. In Step 1245, the master cylinder hydraulic pressure with hysteresis Pmh (current value) is set, on the basis of Principle 3, to a value that is obtained by subtracting the predetermined value Δp from the previous value of the master cylinder hydraulic pressure with hysteresis Pmhb.

When it is determined as "No" in step 1220 (the condition of being out of the entire hysteresis range), the process goes to Step 1250. In Step 1250, on the basis of Principle 4, the master cylinder hydraulic pressure with hysteresis Pmh (current value) is set to a value that equals to the value α. In this case, the value α is set to the upper limit max. or the lower limit min., which is closer to the previous value of the master cylinder hydraulic pressure with hysteresis Pmhb.

Then, the process goes to Step 1255. In Step 1255, the previous value of the master cylinder hydraulic pressure with hysteresis Pmhb is renewed to the master cylinder hydraulic pressure with hysteresis Pmh (current value) that is obtained in one of Steps 1230, 1240, 1245 and 1250. Then the process goes to Step 1295. Once the process goes to Step 1295, the process goes back to Step 1140 in FIG. 13.

Figure 15:
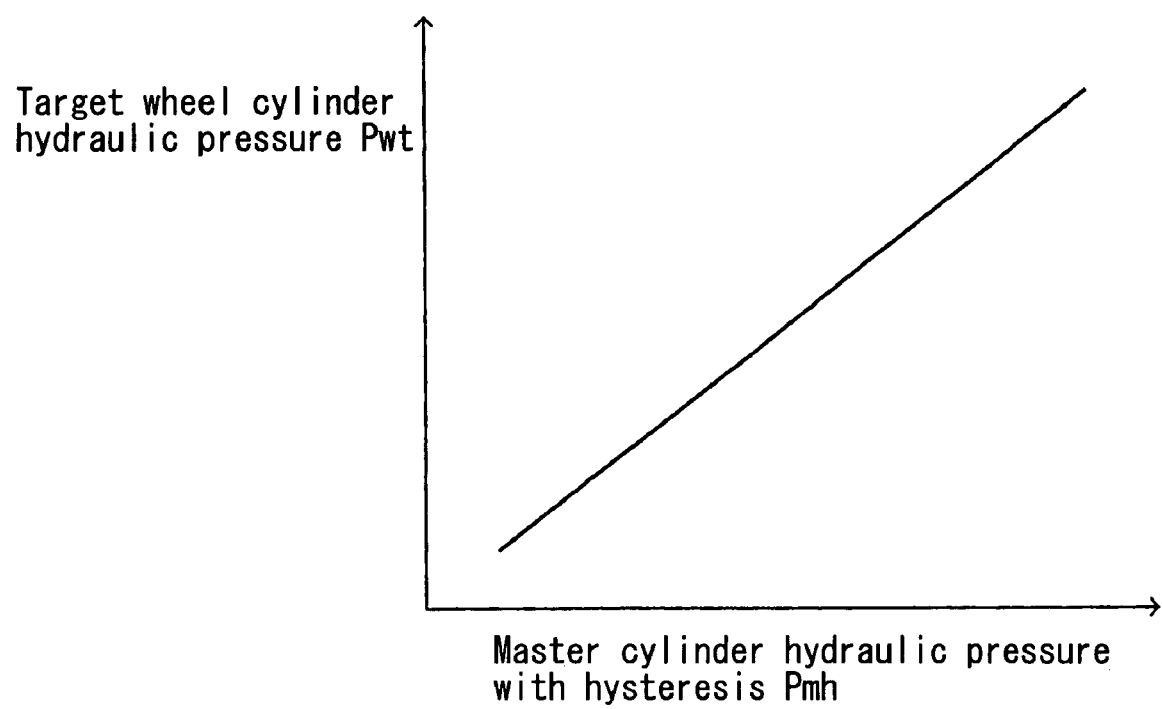
FIG. 15 illustrates a graph indicating a relation between the master cylinder hydraulic pressure with hysteresis and the target wheel cylinder hydraulic pressure referred by the CPU.

In Step 1140, on the basis of the master cylinder hydraulic pressure with hysteresis Pmh (current value) determined in Step 1135 (the routine in FIG. 14) and the table memorized in ROM 52 in advance, the CPU 51 determines a target wheel cylinder hydraulic pressure Pwt. The table regulates a relation between the master cylinder hydraulic pressure with hysteresis Pmh indicated in the graph of FIG. 15 and the target wheel cylinder hydraulic pressure Pwt.

The relation between the master cylinder hydraulic pressure with hysteresis Pmh and the target wheel cylinder hydraulic pressure Pwt regulated in the table corresponds to the relation between the master cylinder hydraulic pressure Pm and the target wheel cylinder hydraulic pressure Pwt indicated in FIG. 6. Thus, as the master cylinder hydraulic pressure with hysteresis Pmh becomes large, the target wheel cylinder hydraulic pressure Pwt is set to a large value.

Then, the Process goes to Step 1145. In Step 1145, the target linear-valve pressure difference ΔPt is set to a value (=Pwt−Pmh), which is calculated by subtracting the master cylinder hydraulic pressure with hysteresis Pmh determined in Step 1135 from the target wheel cylinder hydraulic pressure Pwt determined in Step 1140.

The process goes to Step 1150. In Step 1150, the CPU 51 commands the motor MT (drive circuit of the motor MT) to drive the pumps HP1 and HP2. Then the process goes to Step 1130. In Step 1130, the pumps HP1 and HP2 are driven so as to control the linear-valve pressure difference ΔPd to be equal to the abovementioned value (Pwt−Pmh). As a result, the wheel cylinder hydraulic pressure Pw** (=Pm+ΔPd) is controlled so as to be equal to the target wheel cylinder hydraulic pressure Pwt, as a result, the hydraulic braking force corresponding to the target wheel cylinder hydraulic pressure Pwt is generated. This process is repeated as long as it is determined that the braking operation is executed.

As mentioned above, according to the braking apparatus (control unit of the brake apparatus for the vehicle) having the in-line system related to the embodiment of the present invention. Instead of the master cylinder hydraulic pressure Pm, the target wheel cylinder hydraulic pressure Pwt is set so as to be in proportion to the master cylinder hydraulic pressure with hysteresis Pmh, by use of a value obtained by applying hysteresis to the master cylinder hydraulic pressure Pm (master cylinder hydraulic pressure with hysteresis Pmh) on the basis of Principles 1 through 4. The linear-valve pressure difference ΔPd (=ΔPdf−ΔPdr) is controlled in a manner where the wheel cylinder hydraulic pressure Pw (=Pm+ΔPd) becomes equal to the target wheel cylinder hydraulic pressure Pwt. The wheel cylinder hydraulic pressure Pw (=Pm+ΔPd) is obtained by adding the linear-valve pressure difference ΔPd (=ΔPdf−ΔPdr) generated by means of the pressure difference control valves 16 and 36 to the master cylinder hydraulic pressure Pm generated at the master cylinder master cylinder.

Thus, even when the master cylinder hydraulic pressure Pm varies because of the in-line system, the variation of the master cylinder hydraulic pressure with hysteresis Pmh is reduced, and the variation of the target wheel cylinder hydraulic pressure Pwt is also reduced. As a result, the variation of the master cylinder hydraulic pressure Pm is hard to be continued, as a result, generation of the master cylinder hydraulic pressure hunting is reduced. Thus, the brake feeling can be improved.

The present invention is not limited to the embodiment and may be modified within a scope of the present invention. Foe example, in the embodiment, as illustrated in FIG. 8, the master cylinder hydraulic pressure hunting is reduced by using a combination of the static hysteresis range and the dynamic hysteresis range. However, as illustrated in FIG. 12, the master cylinder hydraulic pressure hunting may be reduced by using only the static hysteresis range, without the dynamic hysteresis range.

Figure 16:
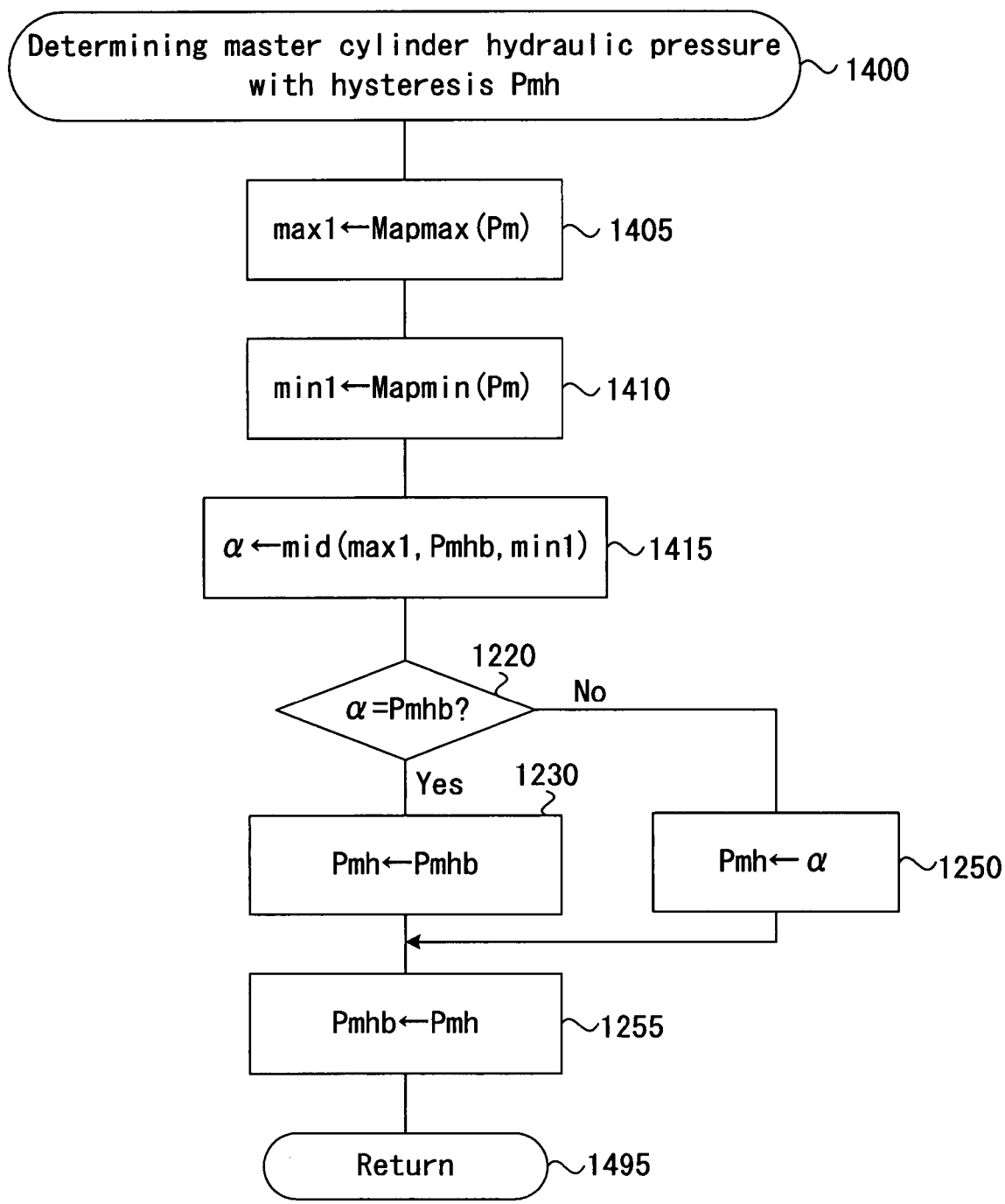
FIG. 16 illustrates a flow chart indicating a routine executed by a CPU of another embodiment of the present invention.

In this configuration, a routine indicated by a flow chart illustrated in FIG. 16 is executed instead of the routine illustrated in FIG. 14. The same numerals are applied to the same operations in both routines.

The routine in FIG. 16 is basically similar to the routine in FIG. 14. Specifically, in the routine in FIG. 16, Steps 1205, 1210 and 1215 in FIG. 14 are substituted by Steps 1405, 1410 and 1415, and Steps 1225, 1235, 1240 and 1245 are omitted.

In Steps 1405, 1410 and 1415, an upper limit maxi and a lower limit min1 are used (see FIG. 8) instead of the upper limit max and a lower limit min. in Steps 1205, 1210 and 1215 in the routine of FIG. 16. The omission of the Step 1225, 1235, 1240 and 1245 means that the "condition of being within the dynamic hysteresis A" and the "condition of being within the dynamic hysteresis B" do not exists in the routine of FIG. 16.

Further, in the third embodiment, the dynamic hysteresis range A and the dynamic hysteresis range B are set in addition to the static hysteresis range, however, one of the dynamic hysteresis range A and dynamic hysteresis range B may not be used alternatively.

Furthermore, the distance (distance D) of the dynamic hysteresis range A equals to the distance (distance D) of the dynamic hysteresis range B, however, each distance may be different.

Further, in the third embodiment, the target wheel cylinder hydraulic pressure Pwt is determined on the basis of only the master cylinder hydraulic pressure with hysteresis Pmh (see Step 1140 in FIG. 15), however, the target wheel cylinder hydraulic pressure Pwt may be set on the basis of other parameters, such as a vehicle speed, together with the master cylinder hydraulic pressure with hysteresis Pmh.

Further, when the braking apparatus of the present invention is applied to an electric vehicle or a hybrid vehicle, which has a motor as a driving source, as the compensation braking force used for compensating the shortage of the master cylinder-hydraulic pressure Pm relative to the target wheel cylinder hydraulic pressure Pwt, a regenerative braking force generated by the motor may be used together with the hydraulic braking force on the basis of the linear-valve pressure difference ΔPd.

Thus, while the regenerative braking force is decreasing, when the operation amount of the brake-operating member (11) is increased, and the target braking force is reduced, this is caused by the suction of the brake fluid from the master cylinder (13) in order to replace the regenerative braking force by the hydraulic braking force. In this case, the wheel cylinder hydraulic pressure is sustained so as not to be reduced. Thus, when the target braking force is reduced due to the suction of the brake fluid from the master cylinder in order to replace the regenerative braking force with the hydraulic braking force, the wheel cylinder hydraulic pressure is sustained so as not to be reduced. Thus, the poor brake feeling caused by the wheel cylinder hydraulic pressure that varies forming a stepped shape can be improved.

Further, when the operation amount of the brake-operating member is increased, and the pressure difference output value of the pressure difference control valve is smaller than the previous pressure difference output value, this is caused by the reduction of the hydraulic braking force due to the suction of the brake fluid from the master cylinder in order to replace the regenerative braking force with the hydraulic braking force. In this case, the pressure difference output value is sustained so as to be equal to or more than the previous output value. Thus, above-mentioned effects can be obtained.

Thus, while the regenerative braking force is increasing, when the operation amount of the brake-operating member (11) is reduced, and the target braking force is increased, this is caused by the decrease of the hydraulic braking force in accordance with the increase of the regenerative braking force. In this case, the wheel cylinder hydraulic pressure is controlled so as not to be increased.

Thus, when the target braking force is increased due to the reduction of the hydraulic braking force in accordance with the increase of the regenerative braking force, the wheel cylinder hydraulic pressure is sustained so as not to be increased. Thus, the poor brake feeling caused by the wheel cylinder hydraulic pressure that varies forming a stepped shape can be improved.

In this configuration, the operation amount of the brake-operating member is reduced, and the pressure difference output value of the pressure difference control valve is greater than the previous pressure difference output value, this is caused by the reduction of the hydraulic braking force in accordance with the increase of the regenerative braking force. In this case, the pressure difference output value is set to be equal to or smaller than the previous pressure difference output value. Thus, above-mentioned effects can be obtained.

The parenthetic numeral applied to each means with corresponds to specific means in embodiments, which will be described below.

The basic hydraulic pressure generating means includes the master cylinder generating the basic hydraulic pressure (a master cylinder hydraulic pressure and a vacuum booster hydraulic pressure) on the basis of an operation of the boosting device (vacuum booster or the like) in accordance with an operation of a brake-operating member by the driver. The pump is a pump (gear pump or the like) that suctions the brake fluid from the hydraulic pressure circuit having a basic hydraulic pressure and discharges the brake fluid to the hydraulic pressure circuit generating the wheel cylinder hydraulic pressure.

The pressure control valve includes a (normally opened or normally closed) a pressure difference control valve having a linear solenoid valve provided between the hydraulic pressure circuit generating the basic hydraulic pressure and the hydraulic pressure circuit generating the wheel cylinder hydraulic pressure. By controlling the pressure difference control valve using the pressurizing hydraulic pressure generated by the operation of the pump, the amount of pressurization (pressure difference) relative to the basic hydraulic pressure (a value obtained by subtracting the basic hydraulic pressure from the wheel cylinder hydraulic pressure) is steplessly controlled. As a result, the wheel cylinder hydraulic pressure can be steplessly controlled not depending on the basic hydraulic pressure (the operation of the brake-operating member).

The compensation braking force may be comprised of only the pressurizing hydraulic braking force, or may be comprised of a combination of the pressurizing hydraulic braking force and the regenerative braking force. When the compensation braking force is comprised of only the pressurizing hydraulic braking force, the total braking force is comprised of only the hydraulic braking force on the basis of the wheel cylinder hydraulic pressure (=basic hydraulic pressure+ amount of pressurization).

A "value corresponding to the basic hydraulic pressure (e.g., a basic value)" is, for example, the basic hydraulic pressure itself, the brake pedal operation amount (a depression force applied to the brake pedal or a brake pedal stroke), or the like. A "value corresponding to the target braking force (e.g., a target value)" is, for example, the target braking force itself, the target wheel cylinder hydraulic pressure in a case where the compensation braking force is comprised of only the pressurizing hydraulic braking force, or the like. A "value corresponding to the total braking force (e.g., a total value)" is, for example, the total braking force itself, the wheel cylinder hydraulic pressure in a case where the compensation braking force is comprised of only the pressurizing hydraulic braking force, or the like.

In a case where the compensation braking force is comprised of only the pressurizing hydraulic braking force, target braking force determining means determines the target wheel cylinder hydraulic pressure on the basis of, for example, the "value corresponding to the basic hydraulic pressure", and compensation braking force controlling means controls, for example, the wheel cylinder hydraulic pressure that is obtained by adding the basic hydraulic pressure to the amount of pressurization so as to be equal to the target wheel cylinder hydraulic pressure.

The target braking force determining means further includes hunting reducing hydraulic pressure calculating means calculating a controlling value corresponding to a hunting reducing hydraulic pressure (Pmh), the controlling value obtained by applying process to the basic hydraulic pressure in order to control a variation thereof, and the target value (Pwt) corresponding to the target braking force is determined by use of the controlling value corresponding to the hunting reducing hydraulic pressure (Pmh). The "value corresponding to the hunting reducing basic hydraulic pressure" is a value obtained by applying a process to the basic hydraulic pressure in order to reduce the variation thereof, or a value obtained by applying a process to the brake pedal operation amount (a depression force applied to the brake pedal, a brake pedal stroke or the like).

In this configuration, the "value corresponding to the target braking force" is determined by using a value (e.g., the value corresponding to the hunting reducing basic hydraulic pressure) obtained by applying a process to the "value corresponding to the basic hydraulic pressure" (e.g., the basic hydraulic pressure itself) in order to reduce the variation thereof. Thus, even when the basic hydraulic pressure varies due to the in-line system, the variation of the "value corresponding to the target braking force" is reduced. As a result, the variation of the basic hydraulic pressure is hard to continue, and the basic hydraulic pressure hunting can be reduced. Thus, the brake feeling can be improved.

The "value corresponding to the hunting reducing basic hydraulic pressure" is, for example, a value obtained by adding hysteresis to the "value corresponding to the basic hydraulic pressure", a value obtained by applying a low-pass filter process to the "value corresponding to the basic hydraulic pressure" or the like.

When the value obtained by applying hysteresis to the value corresponding to the basic hydraulic pressure is used as the value corresponding to the hunting reducing basic hydraulic pressure, it is calculated as follows (hereinafter referred to as a first configuration). First, a relation between the "value corresponding to the basic hydraulic pressure" and the static hysteresis range of the value corresponding to the hunting reducing basic hydraulic pressure (fixed relation) is predetermined.

Then, when a previous value corresponding to the hunting reducing basic hydraulic pressure exists within a static hysteresis range corresponding to a current value corresponding to the basic hydraulic pressure" (hereinafter referred to as a "condition of being within the static hysteresis range), a current value corresponding to the hunting reducing basic hydraulic pressure is set to a value that equals to the previous value corresponding to the hunting reducing basic hydraulic pressure. On the other hand, the previous value corresponding to the hunting reducing basic hydraulic pressure exists out of the static hysteresis range, which corresponds to the current value corresponding to the basic hydraulic pressure (hereinafter referred to as a "condition of being out of the hysteresis range), the current value corresponding to the hunting reducing basic hydraulic pressure is set to a value that equals to either an upper limit or a lower limit of the static hysteresis range that corresponds to the current value corresponding to the basic hydraulic pressure, which is closer to the previous value corresponding to the hunting reducing basic hydraulic pressure.

When the basic hydraulic pressure hunting occurs, the basic hydraulic pressure ("value corresponding to the basic hydraulic pressure") varies with a certain hunting range that is caused depending on, for example, a specification of the hydraulic pressure circuit. Thus, in the first configuration, when a distance of the static hysteresis range is set so as to be larger than the hunting range of the "value corresponding to the basic hydraulic pressure", even when the basic hydraulic pressure varies due to the in-line system, the variation of the value corresponding to the hunting reducing basic hydraulic pressure is firmly reduced, as a result, the basic hydraulic pressure hunting can be firmly reduced.

In the first configuration, in order to firmly reduce the basic hydraulic pressure hunting, the distance of the static hysteresis range needs to be set longer.

In a case where the distance of the static hysteresis range is long, a steady deviation between the basic hydraulic pressure that corresponds to the value corresponding to the hunting reducing basic hydraulic pressure and the basic hydraulic pressure corresponding to the driver's braking operation (hereinafter referred to as a "steady-state deviation") becomes large.

As the steady-state deviation becomes large, a deviation between the target braking force determined on the basis of the value corresponding to the hunting reducing basic hydraulic pressure (actual braking force) and the braking force requested by the driver's braking operation becomes large. Accordingly, the driver may have poor braking feeling.

In order to deal with this situation, a following configuration (hereinafter referred to as a second configuration) will be used to calculate a value corresponding to the hunting reduced basic hydraulic pressure. According to the second configuration, a relation (fixed relation) between the "value corresponding to the basic hydraulic pressure" and the static hysteresis range of the value corresponding to the hunting reducing basic hydraulic pressure is predetermined. In addition to this, a relation (fixed relation) between the "value corresponding to the basic hydraulic pressure" and the dynamic hysteresis range of the value corresponding to the hunting reducing basic hydraulic pressure continuing to at least one of the upper limit and the lower limit of the static hysteresis range is predetermined.

In a case where a previous value corresponding to the hunting reducing basic hydraulic pressure exists within a static hysteresis range corresponding to the current value corresponding to the basic hydraulic pressure (existing within the static hysteresis range), in the same manner as the first configuration, the current value corresponding to the hunting reducing basic hydraulic pressure is set so as to be equal to the previous value corresponding to the hunting reducing basic hydraulic pressure.

In a case where the previous value corresponding to the hunting reducing basic hydraulic pressure exists within the dynamic hysteresis range corresponding to the current value corresponding to the basic hydraulic pressure (hereinafter referred to as a "condition of being within the dynamic hysteresis range"), the current value corresponding to the hunting reducing basic hydraulic pressure is set to a value that is proximate to the static hysteresis range so as to approach by a predetermined value to the previous value corresponding to the hunting reducing basic hydraulic pressure. During the period in which the "condition of being within the dynamic hysteresis range" continues, the current value corresponding to the hunting reducing basic hydraulic pressure gradually approaches the static hysteresis range as time passes. Then, once the previous value corresponding to the hunting reducing basic hydraulic pressure reaches either one of the upper limit and the loser limit of the static hysteresis range corresponding to the current value corresponding to the basic hydraulic pressure (the condition of being within the static hysteresis range), as mentioned above, the current value corresponding to the hunting reducing basic hydraulic pressure is sustained to a value that equals the previous value corresponding to the hunting reducing basic hydraulic pressure (either one of the lower limit and the upper limit of the static hysteresis).

On the other hand, when the previous value corresponding to the hunting reducing basic hydraulic pressure exists out of the entire range of the static hysteresis range and the dynamic hysteresis range corresponding to the current value corresponding to the basic hydraulic pressure (out of the hysteresis range in the first configuration), the current value corresponding to the hunting reducing basic hydraulic pressure is set to a value that equals to one of the upper limit and the lower limit of the entire range corresponding to the current value corresponding to the basic hydraulic pressure, which is closer to the previous value corresponding to the hunting reducing basic hydraulic pressure.

In the second configuration, the length of the entire range (static hysteresis range+dynamic hysteresis range) is set to a value that is larger than the hunting range of the value corresponding to the basic hydraulic pressure, as a result, the basic hydraulic pressure hunting can be firmly reduced.

In addition, comparing the second configuration to the first configuration, because the distance of the static hysteresis range can be reduced, the steady-state deviation can also be reduced. Thus, comparing to the first configuration, the brake feeling can further be improved.

Thus, it is preferable that, in a case where the hysteresis range (entire range) is comprised of a combination of the static hysteresis range and the dynamic hysteresis ranges, one dynamic hysteresis range is set so as to continue to the upper limit, and the other dynamic hysteresis range is set so as to continue to the lower limit of the static hysteresis range.

In this configuration, without making the distance of the static hysteresis range longer (without making the steady-state deviation larger), the variation of the value corresponding to the target braking force can further be reduced, as a result, the basic hydraulic pressure hunting is further reduced.

Further, when the value corresponding to the hunting reducing basic hydraulic pressure is calculated using at least the static hysteresis range, it is preferable that the lower limit of the static hysteresis range is set so as to be equal to or larger than the value corresponding to the basic hydraulic pressure that corresponds to the static hysteresis range.

According to the above-mentioned configuration, while the steady-state deviation has occurred, the value corresponding to the hunting reducing basic hydraulic pressure becomes larger than the value corresponding to the basic hydraulic pressure. This means that the target braking force (actual braking force) determined on the basis of the value corresponding to the hunting reducing basic hydraulic pressure is certainly larger than the braking force requested by the driver's braking operation.

In other words, while the steady state deviation has occurred, a situation where the target braking force determined on the basis of the value corresponding to the hunting reducing basic hydraulic pressure becomes smaller than the braking force requested by the driver's braking operation can be prevented, so that the braking force that meets the driver's request cannot be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A control unit of a brake apparatus for a vehicle having:
basic hydraulic pressure generating means for generating a basic hydraulic pressure in accordance with an operation at a brake-operating member by a driver;
a pump suctioning a brake fluid with the basic hydraulic pressure from a hydraulic pressure circuit in order to generate a pressurizing hydraulic pressure for generating hydraulic pressure that is higher than the basic hydraulic pressure; and a pressure difference control valve controlling an amount of pressurization relative to the basic hydraulic pressure by use of the pressurizing hydraulic pressure generated by driving the pump, wherein a hydraulic braking force is generated by applying wheel cylinder hydraulic pressure to a wheel cylinder, the wheel cylinder hydraulic pressure obtained by adding the amount of pressurization to the basic hydraulic pressure, and the control unit of the brake apparatus for the vehicle comprising:
target braking force determining means for determining a target value corresponding to a target braking force that is a target value of a braking force generated at the wheels on the basis of a basic value corresponding to the basic hydraulic pressure;
compensation braking force controlling means for controlling a compensation braking force so that a total value corresponding to a total braking force is equal to the target value corresponding to the target braking force, the total braking force obtained by adding a basic hydraulic braking force that is a hydraulic braking force based upon the basic hydraulic pressure to the compensation braking force comprised of a pressurizing hydraulic braking force that is a hydraulic braking force based upon at least an amount of pressurization; and
the target braking force determining means including hunting reducing hydraulic pressure calculating means for calculating a controlling value corresponding to a hunting reducing hydraulic pressure, the controlling value obtained by applying process to the basic hydraulic pressure in order to control a variation thereof, and the target value corresponding to the target braking force is determined by use of the controlling value corresponding to the hunting reducing hydraulic pressure.

2. The control unit of the brake apparatus for the vehicle according to claim 1, wherein the hunting reducing hydraulic pressure calculating means uses the controlling value as the controlling value corresponding to the hunting reducing hydraulic pressure, the controlling value obtained by adding hysteresis to the basic value corresponding to the basic hydraulic pressure.

3. The control unit of the brake apparatus for the vehicle according to claim 2, wherein the hunting reducing hydraulic pressure calculating means executes:
presetting a relation between the basic value corresponding to the basic hydraulic pressure and a static hysteresis range of the controlling value corresponding to the hunting reducing hydraulic pressure;
setting a current controlling value corresponding to the hunting reducing hydraulic pressure so as to be equal to a previous controlling value corresponding to the hunting reducing hydraulic pressure, when the previous controlling value corresponding to the hunting reducing hydraulic pressure exists within the static hysteresis range corresponding to a current basic value of the basic hydraulic pressure; and
setting the current controlling value corresponding to the hunting reducing hydraulic pressure so as to be equal to one of an static hysteresis upper limit and a static hysteresis lower limit of the static hysteresis range corresponding to the current basic value corresponding to the basic hydraulic pressure, the one of the upper limit and the lower limit being closer to the previous controlling value corresponding to the hunting reducing hydraulic pressure, when the previous controlling value corresponding to the hunting reducing hydraulic pressure exists out of the static hysteresis range corresponding to the current basic value corresponding to the basic hydraulic pressure.

4. The control unit of the brake apparatus for the vehicle according to claim 3, wherein the hunting reducing hydraulic pressure calculating means sets the static hysteresis lower limit so as to be equal to or more than the basic value corresponding to the basic hydraulic pressure corresponding to the static hysteresis range.

5. The control unit of the brake apparatus for the vehicle according to claim 2, wherein the hunting reducing hydraulic pressure calculating means executes:
presetting a relation between the basic value corresponding to the basic hydraulic pressure and the static hysteresis range corresponding to the controlling value corresponding to the hunting reducing hydraulic pressure;
presetting a relation between the basic value corresponding to the basic hydraulic pressure and the dynamic hysteresis range corresponding to the controlling value corresponding to the hunting reducing hydraulic pressure, the dynamic hysteresis range located so as to continue from one of the static hysteresis upper limit and the static hysteresis lower limit of the static hysteresis range;
setting the current controlling value corresponding to the hunting reducing hydraulic pressure so as to be equal to the previous controlling value corresponding to the hunting reducing hydraulic pressure, when the previous controlling value corresponding to the hunting reducing hydraulic pressure exists within the static hysteresis range corresponding to the current basic value of the basic hydraulic pressure;
setting the current controlling value corresponding to the hunting reducing hydraulic pressure so as to be equal to a value obtained by shifting the previous controlling value corresponding to the hunting reducing hydraulic pressure so as to be come closer to the static hysteresis range with a predetermined value, when the previous controlling value corresponding to the hunting reducing hydraulic pressure exists within the dynamic hysteresis range corresponding to the current basic value corresponding to the basic hydraulic pressure; and
setting the current controlling value corresponding to the hunting reducing hydraulic pressure so as to be equal to one of an entire range upper limit and an entire range lower limit of an entire range corresponding to the current basic value of the basic hydraulic pressure, the one of the entire range upper limit and the entire range lower limit being closer to the previous controlling value corresponding to the hunting reducing hydraulic pressure, the entire range obtained by adding the dynamic hysteresis range corresponding to the current basic value of the basic hydraulic pressure to the static hysteresis range corresponding to the current basic value of the basic hydraulic pressure, when the previous controlling value corresponding to the hunting reducing hydraulic pressure exists out of the entire range.

6. The control unit of the brake apparatus for the vehicle according to claim 5, wherein, at the hunting reducing hydraulic pressure calculating means, two dynamic hysteresis ranges are preset in a manner where the one is provided so as to continue from the static hysteresis upper limit of the static hysteresis range, and the other is provided so as to continue from the static hysteresis lower limit of the static hysteresis range.

7. The control unit of the brake apparatus for the vehicle according to claim 1, comprising:
a boosting device boosting a brake operation force generated when the driver operates the brake-operating member;
a master cylinder at which master cylinder hydraulic pressure corresponding to the boosted brake operation force is generated;
the wheel cylinder generating the hydraulic braking force at each wheel by applying the wheel cylinder hydraulic pressure based upon the master cylinder hydraulic pressure to the wheel;
the pressure difference control valve generating a pressure difference so that the wheel cylinder hydraulic pressure is higher than the master cylinder hydraulic pressure;
the pump applying pressure to the wheel cylinder by suctioning the brake fluid in the master cylinder and discharging the brake fluid toward the wheel cylinders, while the pressure difference is generated at the pressure difference control valve;
a motor for driving the pump;
a hydraulic brake apparatus generating a hydraulic braking force on the basis of the wheel cylinder hydraulic pressure applied to the wheel cylinders;
a regenerative brake apparatus generating a regenerative braking force by applying a resistance force based upon an electric power to the wheel, the electric power generated by the rotation of the wheel;
control means for controlling the hydraulic braking force generated by the hydraulic brake apparatus and the regenerative braking force generated by the regenerative brake apparatus by means of a cooperative braking control of the hydraulic brake apparatus and the regenerative brake apparatus;
the control means including:
regenerative braking force determining means for determining whether or not the regenerative braking force generated by the regenerative brake apparatus is decreasing;
operation amount increase determining means for determining whether or not an operation amount of the brake-operating member is increasing, when the regenerative braking force determining means determines that the regenerative braking force is decreasing;
target braking force calculating means for calculating the target braking force corresponding to a braking force requested by the driver; and
decrease prohibiting control means for controlling the wheel cylinder hydraulic pressure generated at the wheel cylinder so as not to decrease, while the target braking force calculated by the target braking force calculating means is decreased, when the operation amount increase determining means determines that the operation amount of the brake-operating member is increasing.

8. The control unit of the brake apparatus for the vehicle according to claim 7, wherein the decrease prohibiting control means sustains the wheel cylinder hydraulic pressure to a certain level.

9. The control unit of the brake apparatus for the vehicle according to claim 8, wherein the control means further includes:

first pressure difference output value calculating means for calculating on a predetermined calculation cycle a pressure difference output value indicating the pressure difference generated at the pressure difference control valve on the basis of the target braking force calculated by the target braking force calculating means,
first comparing means for determining whether or not the target braking force calculated by the target braking force calculating means is decreasing by determining whether or not the pressure difference output value calculated on a current calculation cycle by the pressure difference output value calculating means is smaller than a previous output value corresponding to a previous pressure difference output value calculated on a previous calculation cycle, when the operation amount increase determining means determines that the operation amount of the brake-operating member is increasing; and
first pressure difference output value changing means, serving as the decrease prohibiting control means, for setting the pressure difference output value so as to be equal to or greater than the previous output value, when the first comparing means determines that the pressure difference output value calculated on the current calculation cycle is smaller than the previous output value calculated on the previous calculation cycle.

10. The control unit of the brake apparatus for the vehicle according to claim 9, wherein the pressure difference control valve generates the pressure difference depending on an electric current value a the controlling current applied to a solenoid coil provided at the pressure difference control valve, the pressure difference being in proportion to the electric current value of the controlling current,
the control means calculates the electric current value of the controlling current applied as the pressure difference output value to the pressure difference control valve at the first pressure difference output value calculating means, and the control means sets an electric current value as the pressure difference output value calculated on a current calculation cycle so as to be equal to or more than the electric current value of the controlling current calculated on the previous calculation cycle at the first pressure difference output value calculating means.

11. The control unit of the brake apparatus for the vehicle according to claim 8, wherein the regenerative braking force determining means determines whether or not the regenerative braking force is increasing,
and the control means further includes:
operation amount decrease determining means for determining whether or not the operation amount of the brake-operating member is decreasing, when the regenerative braking force determining means determines that the regenerative braking force is increasing; and
increase prohibiting control means for controlling the wheel cylinder hydraulic pressure generated at each wheel cylinder so as not to increase, while the target braking force calculated by the target braking force calculating means is increasing, when the operation amount decrease determining means determines that the operation amount of the brake-operating member is reduced.

12. The control unit of the brake apparatus for the vehicle according to claim 11, wherein the control means further includes:
second pressure difference output value calculating means for calculating on a predetermined calculation cycle a pressure difference output value indicating the pressure difference generated at the pressure difference control valve, on the basis of the target braking force calculated by the target braking force calculating means;

second comparing means for determining whether or not the target braking force calculated by the target braking force calculating means is increasing by determining whether or not the pressure difference output value calculated on a current calculation cycle by the pressure difference output value calculating means is higher than a previous output value corresponding to a previous pressure difference output value calculated on a previous calculation cycle, when the operation amount decrease determining means determines that the operation amount of the brake-operating member is decreasing; and second pressure difference output value changing means, serving as the increase prohibiting control means, for setting the pressure difference output value so as to be equal to or smaller than the previous output value, when the second comparing means determines that the pressure difference output value calculated on the current calculation cycle is higher than the previous output value calculated on the previous calculation cycle.

* * * * *